United States Patent
Saneto et al.

(10) Patent No.: US 12,345,907 B2
(45) Date of Patent: Jul. 1, 2025

(54) OPTICAL LAMINATE, LAMINATED OPTICAL FILM, OPTICAL ARTICLE, AND VIRTUAL REALITY DISPLAY DEVICE

(71) Applicant: FUJIFILM Corporation, Tokyo (JP)

(72) Inventors: Ryuji Saneto, Minamiashigara (JP); Yujiro Yanai, Minamiashigara (JP); Yohei Hamachi, Minamiashigara (JP); Akira Maruyama, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 18/514,471

(22) Filed: Nov. 20, 2023

(65) Prior Publication Data
US 2024/0111198 A1     Apr. 4, 2024

Related U.S. Application Data

(63) Continuation of application No. PCT/JP2022/023315, filed on Jun. 9, 2022.

(30) Foreign Application Priority Data

Jun. 10, 2021 (JP) .................................. 2021-097089
Aug. 11, 2021 (JP) .................................. 2021-131379
(Continued)

(51) Int. Cl.
*G02B 5/30* (2006.01)
*B32B 7/023* (2019.01)
(Continued)

(52) U.S. Cl.
CPC ............ *G02B 5/3016* (2013.01); *B32B 7/023* (2019.01); *G02B 5/0816* (2013.01);
(Continued)

(58) Field of Classification Search
CPC ............................ G02B 5/3016; G02B 5/0816
See application file for complete search history.

(56) References Cited

U.S. PATENT DOCUMENTS 5,517,366 A     5/1996  Togino
6,519,017 B1 *  2/2003  Ichihashi ............ G02F 1/13363
                                              349/117
(Continued)

FOREIGN PATENT DOCUMENTS

JP       7-120679 A       5/1995
JP    2004-309618 A      11/2004
(Continued)

OTHER PUBLICATIONS

International Preliminary Report on Patentability and Written Opinion of the International Searching Authority for International Application No. PCT/JP2022/023315, dated Dec. 21, 2023, with an English translation.

(Continued)

*Primary Examiner* — Paisley L Wilson
(74) *Attorney, Agent, or Firm* — Birch, Stewart, Kolasch & Birch, LLP

(57) ABSTRACT

An object of present invention is to provide an optical laminate that can be used for a reflective circular polarizer with little occurrence of a ghost in a case of being used in a virtual reality display device, an electronic finder, or the like; a laminated optical film including the reflective circular polarizer; an optical article including the optical laminate; and a virtual reality display device including the optical article. The optical laminate of the present invention includes two or more laminated reflective layers, in which the laminated reflective layer includes one reflective layer A that includes at least one or more cholesteric liquid crystal layers formed of a first liquid crystal compound which substantially consists of a rod-like liquid crystal compound (Continued)

and that does not include a cholesteric liquid crystal layer formed of a second liquid crystal compound which substantially consists of a disk-like liquid crystal compound, and one reflective layer B that includes at least one or more cholesteric liquid crystal layers formed of the second liquid crystal compound which substantially consists of a disk-like liquid crystal compound and that does not include a cholesteric liquid crystal layer formed of the first liquid crystal compound which substantially consists of a rod-like liquid crystal compound, and predetermined requirements are satisfied.

23 Claims, 5 Drawing Sheets

(30) Foreign Application Priority Data

Oct. 11, 2021 (JP) ................................ 2021-166830
Jan. 19, 2022 (JP) ................................ 2022-006662

(51) Int. Cl.
*G02B 5/08* (2006.01)
*G02F 1/1335* (2006.01)
*G02F 1/13363* (2006.01)
*G02F 1/137* (2006.01)
*G02B 27/00* (2006.01)

(52) U.S. Cl.
CPC .. *G02F 1/133502* (2013.01); *G02F 1/133635* (2021.01); *G02F 1/133638* (2021.01); *G02F 1/13718* (2013.01); *B32B 2307/416* (2013.01); *G02B 27/0018* (2013.01); *G02F 1/133533* (2013.01); *G02F 1/133536* (2013.01); *G02F 1/133541* (2021.01); *G02F 1/133543* (2021.01); *G02F 2201/343* (2013.01); *G02F 2413/13* (2013.01)

(56) References Cited

U.S. PATENT DOCUMENTS

| | | |
|---|---|---|
| 6,760,157 B1 | 7/2004 | Allen et al. |
| 2016/0170114 A1 | 6/2016 | Watano et al. |
| 2018/0143363 A1 | 5/2018 | Ichihashi et al. |
| 2018/0215843 A1 | 8/2018 | Hoshino et al. |
| 2019/0033498 A1* | 1/2019 | Tanaka ................. G02B 5/0841 |
| 2019/0041561 A1* | 2/2019 | Goto ........................ G02B 5/22 |
| 2019/0243043 A1 | 8/2019 | Inada et al. |
| 2019/0243045 A1 | 8/2019 | Inada et al. |
| 2019/0278010 A1* | 9/2019 | Sakai ................... G02B 5/3083 |
| 2021/0173134 A1* | 6/2021 | Peng .................... G02B 5/3016 |

FOREIGN PATENT DOCUMENTS

| | | |
|---|---|---|
| JP | 2005-308988 A | 11/2005 |
| JP | 2011-53705 A | 3/2011 |
| JP | 2013-41141 A | 2/2013 |
| JP | 2013-200516 A | 10/2013 |
| JP | 2015-28656 A | 2/2015 |
| JP | 2015-194675 A | 11/2015 |
| JP | 2017-68111 A | 4/2017 |
| JP | 2017-227720 A | 12/2017 |
| JP | 6277088 B2 | 2/2018 |
| WO | WO2017/006787 A1 | 1/2017 |
| WO | WO2017/057316 A1 | 4/2017 |
| WO | WO2018/079130 A1 | 5/2018 |
| WO | WO2018/079606 A1 | 5/2018 |

OTHER PUBLICATIONS

International Search Report for International Application No. PCT/JP2022/023315, dated Sep. 6, 2022, with an English translation.

* cited by examiner

OPTICAL LAMINATE, LAMINATED OPTICAL FILM, OPTICAL ARTICLE, AND VIRTUAL REALITY DISPLAY DEVICE

CROSS-REFERENCE TO RELATED APPLICATIONS

This application is a Continuation of PCT International Application No. PCT/JP2022/023315 filed on Jun. 9, 2022, which claims priority under 35 U.S.C. § 119(a) to Japanese Patent Application No. 2021-097089 filed on Jun. 10, 2021, Japanese Patent Application No. 2021-131379 filed on Aug. 11, 2021, Japanese Patent Application No. 2021-166830 filed on Oct. 11, 2021, and Japanese Patent Application No. 2022-006662 filed on Jan. 19, 2022. The above applications are hereby expressly incorporated by reference, in their entirety, into the present application.

BACKGROUND OF THE INVENTION

1. Field of the Invention

The present invention relates to an optical laminate, a laminated optical film, an optical article, and a virtual reality display device.

2. Description of the Related Art

A reflective polarizer is a polarizer having a function of reflecting one polarized light in incidence ray and transmitting the other polarized light. Reflected light and transmitted light due to the reflective polarizer are in a polarization state of being orthogonal to each other. Here, the polarization state of being orthogonal to each other denotes a polarization state in which both lights are positioned at antipodal points on the Poincare sphere, and for example, linearly polarized lights orthogonal to each other or clockwise circularly polarized light and counterclockwise circularly polarized light are in the corresponding state.

As a reflective linear polarizer in which the transmitted light and the reflected light are converted into linearly polarized light, for example, a film obtained by stretching a dielectric multi-layer film, as described in JP2011-053705A, and a wire grid polarizer as described in JP2015-028656A have been known.

In addition, as a reflective circular polarizer in which the transmitted light and the reflected light are converted into circularly polarized light, for example, a film having a light reflecting layer obtained by immobilizing a cholesteric liquid crystalline phase, as described in JP6277088B, has been known.

The reflective polarizer is used for the purpose of extracting only specific polarized light from incidence rays or separating incidence rays into two polarized light. For example, in a liquid crystal display device, the reflective polarizer is used as a luminance-improving film which enhances light utilization efficiency by reflecting unnecessary polarized light from backlight and reusing the light. In addition, in a liquid crystal projector, the reflective polarizer is also used as a beam splitter which separates light from a light source into two linearly polarized light and supplies each of the two linearly polarized light to a liquid crystal panel.

In addition, in recent years, a method of using the reflective polarizer has been suggested for the purpose of generating a virtual image or a real image by partially reflecting external light or light from an image display apparatus. For example, JP2017-227720A discloses an in-vehicle room mirror which reflects light from behind using the reflective polarizer. In addition, JP1995-120679A (JP-H7-120679A) discloses a method of generating a virtual image by reflecting light between the reflective polarizer and a half mirror to reciprocate the light, in order to reduce the size and the thickness of a display unit in a virtual reality display device, an electronic finder, or the like.

SUMMARY OF THE INVENTION

According to studies conducted by the present inventors, it has been found that, in a case where a reflective polarizer partially reflects external light or light from an image display apparatus to generate a virtual image or a real image, sharpness of the image may be decreased with any of the reflective polarizers of the related art, disclosed in JP2011-053705A and JP2015-028656A. In contrast, it has been found that, by using a reflective circular polarizer having a light reflecting layer obtained by immobilizing a cholesteric liquid crystalline phase, favorable image sharpness is obtained. The present inventors have considered that the reason for this that, since a reflective circular polarizer having a high polarization degree can be achieved with a thin film by having the light reflecting layer obtained by immobilizing a cholesteric liquid crystalline phase, it is less susceptible to influence of fluctuation due to foreign matter or due to coarseness and fineness of material distribution.

Furthermore, according to the studies by the present inventors, the virtual reality display device, the electronic finder, or the like utilizes not only the reflected light but also the transmitted light, but in this case, it is important to suppress a ghost that is visually recognized as transmitted light which is originally desired to be cut is transmitted. In the reflective circular polarizer of the related art, disclosed in JP6277088B, suppression of the ghost is observed, and there is room for further improvement.

The present invention has been made in consideration of the above-described problems, and an object to be achieved by the present invention is to provide an optical laminate that can be used for a reflective circular polarizer with little occurrence of a ghost in a case of being used in a virtual reality display device, an electronic finder, or the like; a laminated optical film including the reflective circular polarizer; an optical article including the optical laminate; and a virtual reality display device including the optical article.

As a result of intensive studies repeatedly conducted by the present inventors on the above-described object, it has been found that the above-described object can be achieved by the following configurations.

[1] An optical laminate comprising:
two or more laminated reflective layers,
in which the laminated reflective layer includes
one reflective layer A that includes at least one or more cholesteric liquid crystal layers formed of a first liquid crystal compound which substantially consists of a rod-like liquid crystal compound and that does not include a cholesteric liquid crystal layer formed of a second liquid crystal compound which substantially consists of a disk-like liquid crystal compound, and
one reflective layer B that includes at least one or more cholesteric liquid crystal layers formed of the second liquid crystal compound which substantially consists of a disk-like liquid crystal compound and that does not include a cholesteric liquid crystal layer formed of the first liquid crystal compound which substantially consists of a rod-like liquid crystal compound, among the two or more laminated reflective layers, in a case where the reflective layers A face each other in two laminated reflective layers adjacent to each other in a lamination direction, central wavelengths of reflected light of the reflective layers A included in the two adjacent laminated reflective layers are different from each other, and among the two or more laminated reflective layers, in a case where the reflective layers B face each other in two laminated reflective layers adjacent to each other in the lamination direction, central wavelengths of reflected light of the reflective layers B included in the two adjacent laminated reflective layers are different from each other.

[2] The optical laminate according to [1],
in which the reflective layer A and the reflective layer B are alternately arranged in the lamination direction of the optical laminate.

[3] The optical laminate according to [1] or [2],
in which a total number of the laminated reflective layers is 20 or less.

[4] The optical laminate according to any one of [1] to [3],
in which a reflectivity of the optical laminate to light having a wavelength of 400 to 700 nm is 40% or more and less than 50%.

[5] The optical laminate according to any one of [1] to [4],
in which the laminated reflective layer is configured such that one reflective layer A and one reflective layer B are in direct contact with each other, or configured such that one reflective layer A and one reflective layer B are arranged with an adhesion layer between the reflective layer A and the reflective layer B.

[6] An optical laminate comprising, in the following order:
a first layer;
a second layer;
a third layer; and
a fourth layer,
in which all of the first layer to the fourth layer are cholesteric liquid crystal layers, all of the first layer to the fourth layer have light reflectivity,
each central wavelength of reflected light of the first layer to the fourth layer is within any range of 430 to 480 nm, 520 to 570 nm, 570 to 620 nm, or 620 to 670 nm,
a sign of a retardation in a film thickness direction of the first layer at a wavelength of 550 nm is opposite to a sign of a retardation in the film thickness direction of the second layer at a wavelength of 550 nm, and
a sign of a retardation in the film thickness direction of the third layer at a wavelength of 550 nm is opposite to a sign of a retardation in the film thickness direction of the fourth layer at a wavelength of 550 nm.

[7] The optical laminate according to [6],
in which one of the first layer and the second layer is a cholesteric liquid crystal layer formed of a rod-like liquid crystal compound and the other is a cholesteric liquid crystal layer formed of a disk-like liquid crystal compound, and
one of the third layer and the fourth layer is a cholesteric liquid crystal layer formed of a rod-like liquid crystal compound and the other is a cholesteric liquid crystal layer formed of a disk-like liquid crystal compound.

[8] The optical laminate according to [6] or [7],
in which the central wavelength of the reflected light of one of the first layer and the fourth layer is in the range of 430 to 480 nm and the central wavelength of the reflected light of the other is in the range of 620 to 670 nm.

[9] The optical laminate according to any one of [6] to [8],
in which the central wavelength of the reflected light of the first layer is in the range of 430 to 480 nm,
the central wavelength of the reflected light of the second layer is in the range of 520 to 570 nm,
the central wavelength of the reflected light of the third layer is in the range of 570 to 620 nm, and
the central wavelength of the reflected light of the fourth layer is in the range of 620 to 670 nm.

[10] An optical laminate comprising, in the following order:
a first layer;
a second layer; and
a third layer,
in which all of the first layer to the third layer are cholesteric liquid crystal layers,
the second layer is a pitch gradient layer in which a helical pitch changes in a film thickness direction,
all of the first layer to the third layer have light reflectivity,
each central wavelength of reflected light of the first layer to the third layer is within any range of 430 to 480 nm, 520 to 620 nm, or 620 to 670 nm,
a sign of a retardation in a film thickness direction of the first layer at a wavelength of 550 nm is opposite to a sign of a retardation in the film thickness direction of the second layer at a wavelength of 550 nm, and
the sign of the retardation in the film thickness direction of the second layer at a wavelength of 550 nm is opposite to a sign of a retardation in the film thickness direction of the third layer at a wavelength of 550 nm.

[11] The optical laminate according to [10],
in which the first layer is a cholesteric liquid crystal layer formed of a rod-like liquid crystal compound, the second layer is a cholesteric liquid crystal layer formed of a disk-like liquid crystal compound, and the third layer is a cholesteric liquid crystal layer formed of a rod-like liquid crystal compound, or
the first layer is a cholesteric liquid crystal layer formed of a disk-like liquid crystal compound, the second layer is a cholesteric liquid crystal layer formed of a rod-like liquid crystal compound, and the third layer is a cholesteric liquid crystal layer formed of a disk-like liquid crystal compound.

[12] The optical laminate according to or [11],
in which the central wavelength of the reflected light of the first layer is in the range of 430 to 480 nm,
the central wavelength of the reflected light of the second layer is in the range of 520 to 620 nm, and
the central wavelength of the reflected light of the third layer is in the range of 620 to 670 nm.

[13] A laminated optical film comprising, in the following order, at least:
a reflective circular polarizer;
a retardation layer which converts circularly polarized light into linearly polarized light; and
a linear polarizer,
in which the reflective circular polarizer is the optical laminate according to any one of [1] to [12].

[14] The laminated optical film according to [13],
in which the linear polarizer includes a light absorption anisotropic layer which contains at least a liquid crystal compound and a dichroic substance.

[15] The laminated optical film according to or [14],
further comprising: a positive C-plate.

[16] The laminated optical film according to any one of to [15], further comprising: an antireflection layer on a surface.

[17] The laminated optical film according to [16], in which the antireflection layer is a moth-eye film or an AR film.

[18] The laminated optical film according to any one of to [17], further comprising:
a resin base material having a tan δ peak temperature of 170° C. or lower.

[19] An optical article comprising:
the optical laminate according to any one of [1] to [12].

[20] A virtual reality display device comprising:
the optical article according to [19].

According to the present invention, it is possible to provide an optical laminate that can be used for a reflective circular polarizer with little occurrence of a ghost in a case of being used in a virtual reality display device, an electronic finder, or the like.

In addition, according to the present invention, it is possible to provide a laminated optical film including the reflective circular polarizer, an optical article including the optical laminate, and a virtual reality display device including the optical article.

DESCRIPTION OF THE PREFERRED EMBODIMENTS

Figure 1:
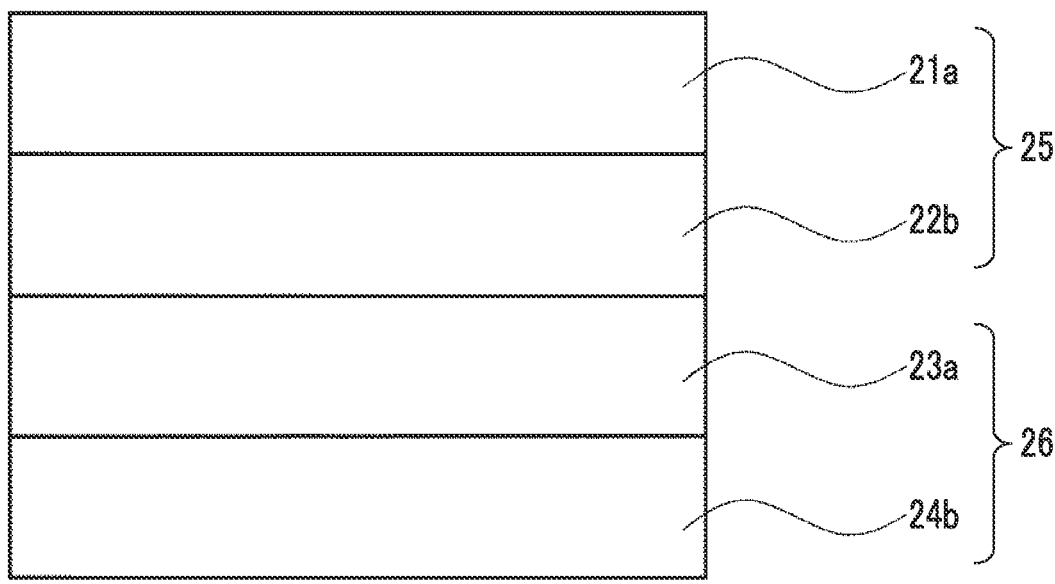
FIG. 1 is a schematic diagram showing an example of an optical laminate according to a first embodiment of the present invention.

Hereinafter, the present invention will be described in detail. The description of the configuration requirements described below may be made based on representative embodiments or specific examples, but the present invention is not limited to such embodiments.

Any numerical range expressed using "to" in the present specification refers to a range including the numerical values before and after the "to" as a lower limit value and an upper limit value, respectively.

In the present specification, a term "orthogonal" does not denote 90° in a strict sense, but denotes 90°±10°, preferably 90°±5°. In addition, a term "parallel" does not denote 0° in a strict sense, but denotes 0°±10°, preferably 0°±5°. Furthermore, a term "45°" does not denote 45° in a strict sense, but denotes 45°±10°, preferably 45°±5°.

In the present specification, a term "absorption axis" denotes a polarization direction in which absorbance is maximized in a plane in a case where linearly polarized light is incident. In addition, a term "reflection axis" denotes a polarization direction in which reflectivity is maximized in a plane in a case where linearly polarized light is incident. In addition, a term "transmission axis" denotes a direction orthogonal to the absorption axis or the reflection axis in a plane. Furthermore, a term "slow axis" denotes a direction in which refractive index is maximized in a plane.

In the present specification, a retardation denotes an in-plane retardation unless otherwise specified, and is referred to as Re ($\lambda$). Here, Re ($\lambda$) represents an in-plane retardation at a wavelength $\lambda$, and the wavelength $\lambda$ is 550 nm unless otherwise specified.

In addition, a retardation at the wavelength $\lambda$ in a thickness direction is referred to as Rth ($\lambda$) in the present specification.

As Re ($\lambda$) and Rth ($\lambda$), values measured at the wavelength $\lambda$ with AxoScan OPMF-1 (manufactured by Opto Science, Inc.) can be used. By inputting an average refractive index (($n_x+n_y+n_z$)/3) and a film thickness (d ($\mu$m)) in AxoScan,
a slow axis direction)(°),
Re ($\lambda$)=R0 ($\lambda$), and
"Rth ($\lambda$)=(($n_x+n_y$)/2−$n_z$)×d" are calculated.

Examples of the optical laminate according to the present invention include a first embodiment, a second embodiment, and a third embodiment.

Hereinafter, the first embodiment, the second embodiment, and the third embodiment of the optical laminate according to the present invention will be described.

First Embodiment

The optical laminate according to the first embodiment of the present invention includes two or more laminated reflective layers,
in which the laminated reflective layer includes
one reflective layer A that includes at least one or more cholesteric liquid crystal layers (hereinafter, also referred to as "liquid crystal layers 1") formed of a first liquid crystal compound which substantially consists of a rod-like liquid crystal compound and that does not include a cholesteric liquid crystal layer (hereinafter, also referred to as "liquid crystal layer 2") formed of a second liquid crystal compound which substantially consists of a disk-like liquid crystal compound, and
one reflective layer B that includes at least one or more liquid crystal layers 2 and that does not include the liquid crystal layer 1,
among the two or more laminated reflective layers, in a case where the reflective layers
A face each other in two laminated reflective layers adjacent to each other in a lamination direction, central wavelengths of reflected light of the reflective layers A included in the two adjacent laminated reflective layers are different from each other, and
among the two or more laminated reflective layers, in a case where the reflective layers B face each other in two laminated reflective layers adjacent to each other in the lamination direction, central wavelengths of reflected light of the reflective layers B included in the two adjacent laminated reflective layers are different from each other.

The optical laminate according to the first embodiment of the present invention will be described with reference to the accompanying drawing. FIG. 1 is a schematic cross-sectional view showing an example of a configuration of an optical laminate 10 according to the first embodiment.

In the aspect shown in FIG. 1, the optical laminate 10 is composed of a first laminated reflective layer 25 and a second laminated reflective layer 26, in which the first laminated reflective layer 25 is composed of a reflective layer A 21a and a reflective layer B 22b, and the second laminated reflective layer 26 is composed of a reflective layer A 23a and a reflective layer B 24b. In the optical laminate 10 of the aspect shown in FIG. 1, the reflective layer A 21a, the reflective layer B 22b, the reflective layer A 23a, and the reflective layer B 24b are laminated in this order.

The optical laminate according to the first embodiment of the present invention can be used for a reflective circular polarizer. In a case where the optical laminate has the above-described configuration, since the reflective layer A has a positive Rth and the reflective layer B has a negative Rth, it is considered that the Rth's are cancelled out, and occurrence of a ghost can be suppressed even for incidence ray from an oblique direction.

Hereinafter, the first embodiment according to the present invention will be described in detail.

[Laminated Reflective Layer]

The optical laminate according to the first embodiment of the present invention includes two or more laminated reflective layers, in which the laminated reflective layer includes one reflective layer A and one reflective layer B described in detail later. That is, the optical laminate according to the first embodiment of the present invention includes two or more reflective layers A and two or more reflective layers B.

In the laminated reflective layer, the reflective layer A and the reflective layer B may be in direct contact with each other, or the reflective layer A and the reflective layer B may be laminated through other layers. The other layers are not particularly limited, and examples thereof include an adhesion layer (for example, an adhesive layer, a pressure sensitive adhesive layer, and the like), a refractive index adjusting layer, a resin film, a positive C-plate, and an alignment layer.

In addition, the laminated reflective layer may be configured such that one reflective layer A and one reflective layer B are in direct contact with each other, or may be configured such that one reflective layer A and one reflective layer B are arranged with an adhesion layer between the reflective layer A and the reflective layer B. Among these, it is preferable that the laminated reflective layer is configured such that one reflective layer A and one reflective layer B are in direct contact with each other.

In the optical laminate, the laminated reflective layers may be laminated such that the reflective layer A and the reflective layer B are alternately arranged, may be laminated such that the reflective layers A face each other, or may be laminated such that the reflective layers B face each other.

For example, in a case where the optical laminate according to the first embodiment includes two laminated reflective layers, the reflective layer A, the reflective layer B, the reflective layer A, and the reflective layer B may be laminated in this order; the reflective layer A, the reflective layer B, the reflective layer B, and the reflective layer A are laminated in this order; or the reflective layer B, the reflective layer A, the reflective layer A, and the reflective layer B are laminated in this order.

However, in a case where the reflective layers A face each other in two laminated reflective layers adjacent to each other in a lamination direction (for example, in a case where the reflective layer B, the reflective layer A, the reflective layer A, and the reflective layer B are laminated in this order), central wavelengths of reflected light of the reflective layers A included in the two adjacent laminated reflective layers are different from each other; and among the two or more laminated reflective layers, in a case where the reflective layers B face each other in two laminated reflective layers adjacent to each other in the lamination direction (for example, the reflective layer A, the reflective layer B, the reflective layer B, and the reflective layer A are laminated in this order), central wavelengths of reflected light of the reflective layers B included in the two adjacent laminated reflective layers are different from each other.

Figure 2:
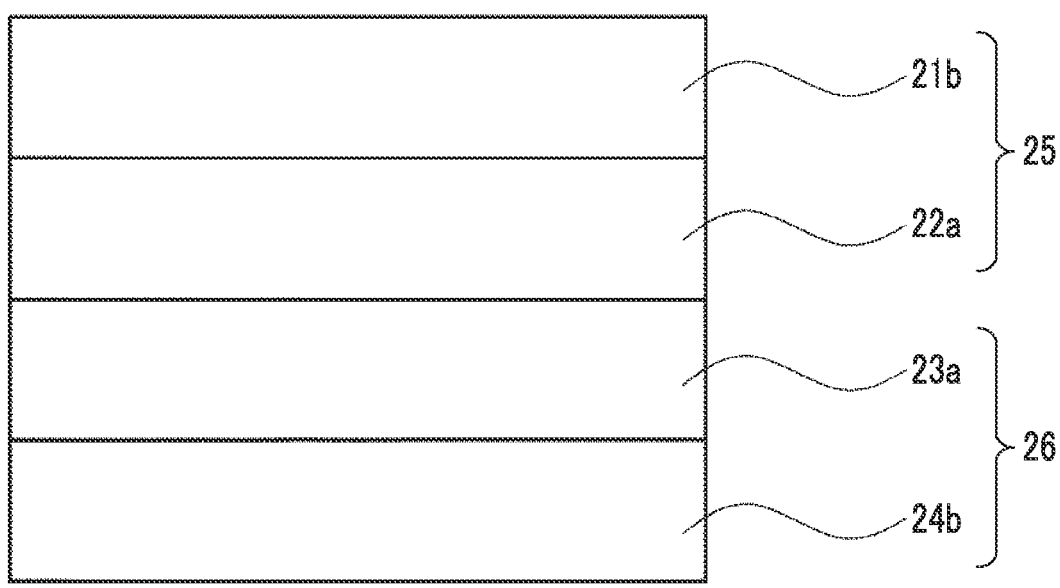
FIG. 2 is a schematic diagram showing an example of the optical laminate according to the first embodiment of the present invention.

Hereinafter, an optical laminate in the case where the reflective layers A face each other in the two laminated reflective layers adjacent to each other in the lamination direction will be described with reference to the accompanying drawing. An optical laminate 11 shown in FIG. 2 is composed of a first laminated reflective layer 25 and a second laminated reflective layer 26, in which the first laminated reflective layer 25 is composed of a reflective layer B 21b and a reflective layer A 22a, and the second laminated reflective layer 26 is composed of a reflective layer A 23a and a reflective layer B 24b. In the optical laminate 11 of the aspect shown in FIG. 2, the reflective layer B 21b, the reflective layer A 22a, the reflective layer A 23a, and the reflective layer B 24b are laminated in this order. However, a central wavelength of reflected light of the reflective layer A 22a is different from a central wavelength of reflected light of the reflective layer A 23a. In addition, in the optical laminate 11 shown in FIG. 2, the reflective layer A 22a is included in the first laminated reflective layer 25, and the reflective layer A 23a is included in the second laminated reflective layer 26.

That is, as will be described in detail below, the reflective layer A may include two or more liquid crystal layers 1 in which central wavelengths of reflected light are different from each other, but in the optical laminate, in a case where two or more liquid crystal layers 1 are arranged in succession, the reflective layers A and the laminated reflective layers are configured such that the number of laminated reflective layers is maximized.

Similarly, as will be described in detail below, the reflective layer B may include two or more liquid crystal layers 2 in which central wavelengths of reflected light are different from each other, but in the optical laminate, in a case where two or more liquid crystal layers 2 are arranged in succession, the reflective layers B and the laminated reflective layers are configured such that the number of laminated reflective layers is maximized.

Among these aspects of the above-described lamination of the laminated reflective layers, an aspect in which the reflective layer A and the reflective layer B are laminated so as to be alternately arranged is preferable. That is, an aspect in which the reflective layer A and the reflective layer B are alternately arranged in a thickness direction of the optical laminate is preferable.

The optical laminate according to the first embodiment includes two or more laminated reflective layers, but may include three or more laminated reflective layers or four or more laminated reflective layers. That is, the optical laminate may include two or more reflective layers A and two or more reflective layers B, may include three or more reflective layers A and three or more reflective layers B, or may include four or more reflective layers A and four or more reflective layers B.

The total number of the laminated reflective layers included in the optical laminate is preferably 30 or less, more preferably 20 or less, and still more preferably 10 or less. That is, the total number of the reflective layers A and the reflective layers B in the optical laminate is preferably 60 or less, preferably 40 or less, and more preferably 20 or less.

A thickness of the laminated reflective layer is preferably 0.2 µm or more, more preferably 0.4 µm or more, and still more preferably 0.6 µm or more. In addition, the thickness of the laminated reflective layer is preferably 20.0 µm or less, more preferably 14.0 µm or less, and still more preferably 10.0 µm or less.

The thickness of the laminated reflective layer can be measured by the same method as that for the reflective layer A and the reflective layer B, which will be described later.

Hereinafter, the reflective layer A and the reflective layer B will be described.

[Reflective Layer A]

The laminated reflective layer included in the optical laminate according to the first embodiment of the present invention includes the reflective layer A which includes at least one or more liquid crystal layers 1 and does not include the liquid crystal layer 2.

The liquid crystal layer 1 is a cholesteric liquid crystal layer formed of a first liquid crystal compound which substantially consists of a rod-like liquid crystal compound, and the liquid crystal layer 1 substantially consists of the rod-like liquid crystal compound. The "cholesteric liquid crystal layer formed of a first liquid crystal compound which substantially consists of a rod-like liquid crystal compound" refers to a layer in which the first liquid crystal compound forms a cholesteric liquid crystalline phase and an alignment state of the cholesteric liquid crystalline phase is fixed. The above-described "substantially consists of a rod-like liquid crystal compound" means that an amount of the rod-like liquid crystal compound in the liquid crystal compound (first liquid crystal compound) contained in the liquid crystal layer 1 is 95% by mass or more. That is, the "first liquid crystal compound which substantially consists of a rod-like liquid crystal compound" means that a content of the rod-like liquid crystal compound is 95% by mass or more with respect to the total mass of the first liquid crystal compound. Among these, it is preferable that the first liquid crystal compound consists of only the rod-like liquid crystal compound.

In addition, the liquid crystal layer 2 is a cholesteric liquid crystal layer formed of a second liquid crystal compound which substantially consists of a disk-like liquid crystal compound, and the liquid crystal layer 2 substantially consists of the disk-like liquid crystal compound. The "cholesteric liquid crystal layer formed of a second liquid crystal compound which substantially consists of a disk-like liquid crystal compound" refers to a layer in which the second liquid crystal compound forms a cholesteric liquid crystalline phase and an alignment state of the cholesteric liquid crystalline phase is fixed. The above-described "substantially consists of a disk-like liquid crystal compound" means that an amount of the disk-like liquid crystal compound in the liquid crystal compound (second liquid crystal compound) contained in the liquid crystal layer 2 is 95% by mass or more. That is, the "second liquid crystal compound which substantially consists of a disk-like liquid crystal compound" means that a content of the disk-like liquid crystal compound is 95% by mass or more with respect to the total mass of the second liquid crystal compound. Among these, it is preferable that the second liquid crystal compound consists of only the disk-like liquid crystal compound.

It is sufficient that the reflective layer A includes one or more liquid crystal layers 1, and the reflective layer A may include two or more liquid crystal layers 1. In a case where the reflective layer A includes two or more liquid crystal layers 1, a layer other than the liquid crystal layer 2 may or may not be included between the two or more liquid crystal layers 1. The other layers are not particularly limited, and examples thereof include an adhesion layer (for example, an adhesive layer, a pressure sensitive adhesive layer, and the like), a refractive index adjusting layer, a resin film, a positive C-plate, and an alignment layer.

The number of liquid crystal layers 1 included in the reflective layer A is preferably 5 or less, more preferably 3 or less, and still more preferably 2 or less. The number of liquid crystal layers 1 included in the reflective layer A is also preferably 1.

For example, in a case where two liquid crystal layers 1 have central wavelengths of reflected light, which are different from each other, the two liquid crystal layers 1 are regarded as two layers. In addition, in a case where central wavelengths of reflected light of two or more liquid crystal layers 1 are the same, for example, the two or more liquid crystal layers 1 regarded as one layer even in a case of being formed by successive application or being separated by the above-described other layers.

In a case where the reflective layer A includes two or more liquid crystal layers 1, a central wavelength of reflected light of the reflective layer A is a central wavelength of reflected light of the entire reflective layer A. A method of measuring the central wavelength of the reflected light is as described below.

A thickness of the reflective layer A is preferably 0.1 µm or more, more preferably 0.2 µm or more, and still more preferably 0.3 µm or more. From the viewpoint that the ghost can be suppressed more, the thickness of the reflective layer A is preferably 10.0 µm or less, more preferably 7.0 µm or less, and still more preferably 5.0 µm or less.

The thickness of the reflective layer A can be measured by producing a cross section of the optical laminate and observing the cross section with a scanning electron microscope. The thickness of the reflective layer A is a value obtained by averaging thicknesses of the reflective layer A at any five points in the cross section of the optical laminate. In a case where the cross section of the optical laminate is observed with the scanning electron microscope, a region of the reflective layer A and a region of the reflective layer B, which will be described later, can be distinguished by a difference in contrast of a captured image. In addition, the regions of the reflective layer A and the reflective layer B can also be distinguished by composition analysis in the film thickness direction with time-of-flight secondary ion mass spectrometry (TOF-SIMS).

Rth of the reflective layer A at a wavelength of 550 nm is preferably 8 to 800 nm, more preferably 16 to 560 nm, and still more preferably 24 to 400 nm.

The Rth of the reflective layer A may be measured by taking out only the reflective layer A from the optical laminate, or may be measured by using Rth of a layer which is produced under the same conditions as those for producing the reflective layer A.

The rod-like liquid crystal compound contained in the above-described liquid crystal layer 1 is not particularly limited, and a known rod-like liquid crystal compound can be used. In addition, it is sufficient that the liquid crystal layer 1 is a layer in which an alignment of the rod-like liquid crystal compound forming the cholesteric liquid crystalline phase is maintained, and typically, the liquid crystal layer 1 can be formed by a method in which a polymerizable rod-like liquid crystal compound having a polymerizable group is aligned in a cholesteric liquid crystalline phase by adding a chiral agent or the like, and then polymerized and cured by ultraviolet irradiation, heating, and the like to form a layer without fluidity. It is sufficient that the liquid crystal layer 1 formed as described above is a layer which has changed to a state in which the alignment is not changed by an external field, an external force, or the like. In the liquid crystal layer 1, it is sufficient that optical properties of the cholesteric liquid crystalline phase are maintained in the layer, and the rod-like liquid crystal compound in the liquid crystal layer 1 may not exhibit liquid crystal properties anymore. For example, the polymerizable rod-like liquid crystal compound may have high molecular weight due to the curing reaction, and may already lose liquid crystal properties.

A central wavelength $\lambda$, of the reflected light of the liquid crystal layer 1 depends on a pitch P of a helical structure (=the period of the helix) in the cholesteric liquid crystalline phase, and is expressed by a relationship of $\lambda = n \times P$ with an average refractive index n of the liquid crystal layer 1. The central wavelength of the reflected light of the liquid crystal layer 1 can be obtained as follows. In a case where a transmission spectrum of the reflective layer A is measured from a normal direction of the liquid crystal layer 1 using a spectrophotometer UV3150 (manufactured by Shimadzu Corporation), a spectrum having a peak in which transmittance decreases is obtained in a region near the central wavelength of the reflected light. Among two wavelengths having a transmittance of ½ of the maximum peak value, in a case where a value of a wavelength on a shorter wavelength side is denoted by $\lambda_l$ (nm) and a value of a wavelength on a longer wavelength side is denoted by $\lambda_h$ (nm), the central wavelength $\lambda$ of the reflected light is determined by the following expression.

$$\lambda = (\lambda_l + \lambda_h)/2$$

The pitch of the cholesteric liquid crystalline phase depends on the type of the chiral agent used together with the polymerizable rod-like liquid crystal compound and the addition concentration thereof, and a cholesteric liquid crystalline phase having a desired pitch can be obtained by adjusting one or more of the above. Regarding a helical turning direction and measuring method of the pitch, it is possible to use the method described on page 46 of "Liquid Crystal Chemical Experiment Introduction" edited by Japan Liquid Crystal Society, published by Sigma Corporation in 2007, and page 196 of "Liquid Crystal Handbook" Liquid Crystal Handbook Editing Committee, Maruzen Publishing Co., Ltd.

[Reflective Layer B]

The laminated reflective layer included in the optical laminate according to the first embodiment of the present invention includes the reflective layer B which includes at least one or more liquid crystal layers 2 and does not include the liquid crystal layer 1.

Definitions of the liquid crystal layer 2 and the liquid crystal layer 1 are as described above.

It is sufficient that the reflective layer B includes one or more liquid crystal layers 2, and the reflective layer A may include two or more liquid crystal layers 2. In a case where the reflective layer B includes two or more liquid crystal layers 2, a layer other than the liquid crystal layer 1 may or may not be included between the two or more liquid crystal layers 2. The other layers are not particularly limited, and examples thereof include an adhesion layer (for example, an adhesive layer, a pressure sensitive adhesive layer, and the like), a refractive index adjusting layer, a resin film, a positive C-plate, and an alignment layer.

The number of liquid crystal layers 2 included in the reflective layer B is preferably 5 or less, more preferably 3 or less, and still more preferably 2 or less. The number of liquid crystal layers 2 included in the reflective layer B is also preferably 1.

For example, in a case where two liquid crystal layers 2 have central wavelengths of reflected light, which are different from each other, the two liquid crystal layers 2 are regarded as two layers. In addition, in a case where central wavelengths of reflected light of two or more liquid crystal layers 2 are the same, for example, the two or more liquid crystal layers 2 regarded as one layer even in a case of being formed by successive application or being separated by the above-described other layers.

In a case where the reflective layer B includes two or more liquid crystal layers 2, a central wavelength of reflected light of the reflective layer B is a central wavelength of reflected light of the entire reflective layer B. The measurement of the central wavelength of the reflected light of each liquid crystal layer 2 is carried out according to the above-described measuring method of the central wavelength of the reflected light of the liquid crystal layer 1.

A thickness of the reflective layer B is preferably 0.1 μm or more, more preferably 0.2 μm or more, and still more preferably 0.3 μm or more. From the viewpoint that the ghost can be suppressed more, the thickness of the reflective layer B is preferably 10.0 μm or less, more preferably 7.0 μm or less, and still more preferably 5.0 μm or less.

The thickness of the reflective layer B can be measured by producing a cross section of the optical laminate and observing the cross section with a transmission electron microscope.

Rth of the reflective layer B at a wavelength of 550 nm is preferably −8 to −800 nm, more preferably −16 to −560 nm, and still more preferably −24 to −400 nm.

The Rth of the reflective layer B may be measured by taking out only the reflective layer B from the optical laminate, or may be measured by using Rth of a layer which is produced under the same conditions as those for producing the reflective layer B.

The disk-like liquid crystal compound contained in the above-described liquid crystal layer 2 is not particularly limited, and a known disk-like liquid crystal compound can be used. In addition, it is sufficient that the liquid crystal layer 2 is a layer in which an alignment of the disk-like liquid crystal compound forming the cholesteric liquid crystalline phase is maintained, and typically, the liquid crystal layer 2 can be formed by a method in which a polymerizable disk-like liquid crystal compound having a polymerizable group is aligned in a cholesteric liquid crystalline phase by adding a chiral agent or the like, and then polymerized and cured by ultraviolet irradiation, heating, and the like to form a layer without fluidity. It is sufficient that the liquid crystal layer 2 formed as described above is a layer which has changed to a state in which the alignment is not changed by an external field, an external force, or the like. In the liquid crystal layer 2, it is sufficient that optical properties of the cholesteric liquid crystalline phase are maintained in the layer, and the disk-like liquid crystal compound in the liquid crystal layer 2 may not exhibit liquid crystal properties anymore. For example, the polymerizable disk-like liquid crystal compound may have high molecular weight due to the curing reaction, and may already lose liquid crystal properties.

A central wavelength λ of the reflected light of the liquid crystal layer 2 depends on a pitch of a helical structure in the cholesteric liquid crystalline phase, and can be defined in the same manner as in the case of the liquid crystal layer 1 and can be measured by the same method.

The pitch of the cholesteric liquid crystalline phase depends on the type of the chiral agent used together with the polymerizable disk-like liquid crystal compound and the addition concentration thereof, and a cholesteric liquid crystalline phase having a desired pitch can be obtained by adjusting one or more of the above. Regarding a helical turning direction and measuring method of the pitch, the above-described documents can be referred to.

[Reflectivity]

A reflectivity of the optical laminate according to the first embodiment of the present invention to light having a wavelength of 400 to 700 nm is preferably 40% or more and less than 50%. In a case where the above-described reflectivity is 40% or more, the ghost is more easily suppressed. The light having a wavelength of 400 to 700 nm refers to unpolarized light.

The reflectivity of the optical laminate to the light having a wavelength of 400 to 700 nm is measured under the following conditions.

An automated absolute reflectance measurement system including an ultraviolet-visible-near infrared spectrophotometer V-750 manufactured by JASCO Corporation is used. S-wave and P-wave polarized light having a wavelength of 350 to 900 nm are incident on the optical laminate at an incidence angle of 5°. Absolute reflectivity with respect to each of the S-wave and the P-wave is measured, and an average value thereof is calculated for each wavelength to obtain a reflection spectrum. From the obtained reflectivity spectrum, an average reflectivity to the light having a wavelength of 400 to 700 nm is calculated and used as the reflectivity of the optical laminate to the light having a wavelength of 400 to 700 nm.

[Types and Arrangement of Reflective Layer A and Reflective Layer B]

The optical laminate according to the first embodiment of the present invention includes the reflective layer A and the reflective layer B, and preferably includes at least a blue light reflecting layer having a reflectivity of 40% or more at a wavelength of 460 nm, a green light reflecting layer having a reflectivity of 40% or more at a wavelength of 550 nm, a yellow light reflecting layer having a reflectivity of 40% or more at a wavelength of 600 nm, and a red light reflecting layer having a reflectivity of 40% or more at a wavelength of 650 nm. Each of the blue light reflecting layer, the green light reflecting layer, the yellow light reflecting layer, and the red light reflecting layer described above may correspond to any of the reflective layer A or the reflective layer B. For example, in a case where the reflective layer A corresponds to the blue light reflecting layer, the central wavelength of the reflected light of the reflective layer A may be adjusted by the above-described method to set the central wavelength of the reflected light to approximately 460 nm. In addition, in a case where the reflective layer B corresponds to the blue light reflecting layer, the central wavelength of the reflected light of the reflective layer B may be adjusted by the above-described method to set the central wavelength of the reflected light to approximately 460 nm. The above-described reflectivity is a reflectivity in a case where non-polarized light is incident on the reflective layer at each wavelength.

In a case where the optical laminate includes the blue light reflecting layer, the green light reflecting layer, the yellow light reflecting layer, and the red light reflecting layer described above, the optical laminate may include two or more blue light reflecting layers, two or more green light reflecting layers, two or more yellow light reflecting layers, or two or more red light reflecting layers.

A central wavelength of reflected light of the above-described blue light reflecting layer is preferably in a range of 430 to 480 nm.

A central wavelength of reflected light of the above-described green light reflecting layer is preferably in a range of 520 to 570 nm.

A central wavelength of reflected light of the above-described yellow light reflecting layer is preferably in a range of 570 to 620 nm.

A central wavelength of reflected light of the above-described red light reflecting layer is preferably in a range of 620 to 670 nm.

A method of measuring the central wavelength of the reflected light is as described above.

In addition, in the optical laminate according to the first embodiment of the present invention, the central wavelengths of the reflected light of the reflective layer A and the reflective layer B included in the optical laminate may be adjusted so that the reflectivity is 40% or more over the entire visible light region (wavelength of 400 to 700 nm).

In addition, in the optical laminate, it is also preferable that the blue light reflecting layer, the green light reflecting layer, the yellow light reflecting layer, and the red light reflecting layer described above are laminated in this order. In addition, in a case where the optical laminate having the above-described lamination order is applied to a reflective circular polarizer described later, in the reflective layer on the long wavelength side (for example, in the red light reflecting layer), the thickness of the reflective layer required to obtain sufficient reflectivity increases, and Rth of the reflective layer itself has a greater effect on light transmitted through the reflective layer. From this viewpoint, it is preferable that a reflective layer arranged on a light source side is the reflective layer on the short wavelength side (for example, the blue light reflecting layer).

In the optical laminate according to the first embodiment of the present invention, it has been described that, since the reflective layer A has a positive Rth and the reflective layer B has a negative Rth, the Rth's are cancelled out, and the details thereof will be described below.

In an optical laminate including n reflective layers, in a case where the reflective layers are named $L_1, L_2, L_3, \ldots,$ and $L_n$ (n is an integer of 4 or more) from a light source side, the sum of Rth of each layer from the reflective layer $L_1$ to the reflective layer $L_i$ (i is an integer of n or less) is denoted by $SRth_i$. Specifically, the $SRth_i$ is expressed as follows.

$SRth_1 = Rth_1$ $SRth_2 = Rth_1 + Rth_2$ $SRth_i = Rth_1 + Rth_2 + \ldots + Rth_i$ $SRth_n = Rth_1 + Rth_2 + \ldots + Rth_i + \ldots + Rth_n$ Absolute values of all of $SRth_i$ ($SRth_1$ to $SRth_n$) are each preferably 0.3 μm or less, more preferably 0.2 μm or less, and still more preferably 0.1 μm or less. The $Rth_i$ of each layer in the above-described expression is determined by the expression for calculating Rth described above.

It is considered that, by setting the $SRth_i$ to be within the above-described preferred range, a retardation which occurs in a case where light is transmitted through each reflective layer can be reduced, and the occurrence of the ghost can be further suppressed even for incidence ray from an oblique direction.

In addition, in a case where the laminated reflective layer is configured such that the reflective layer A and the reflective layer B are in direct contact with each other, in order to reduce a difference in refractive index, it is preferable that the reflective layer A and the reflective layer B are arranged such that an alignment direction (slow axis direction) of the liquid crystal compound (the rod-like liquid crystal compound or the disk-like liquid crystal compound) changes continuously at an interface. For the above-described arrangement, for example, in a case where the reflective layer A is formed on the reflective layer B, a coating liquid containing a rod-like liquid crystal compound is directly applied on the reflective layer B, and the slow axis direction can be aligned while continuous changing at the interface by alignment regulating force of the disk-like liquid crystal compound contained in the reflective layer B.

A thickness of the optical laminate according to the first embodiment of the present invention is preferably 30 μm or less and more preferably 15 μm or less.

The lower limit thereof is not particularly limited, but is, for example, 1 μm or more, preferably 5 μm or more.

A manufacturing method of the optical laminate according to the first embodiment of the present invention, a laminated optical film formed using the optical laminate, and the like will be described later.

Second Embodiment

The optical laminate according to the second embodiment of the present invention includes, in the following order, a first layer, a second layer, a third layer, and a fourth layer,
in which all of the first layer to the fourth layer are cholesteric liquid crystal layers,
all of the first layer to the fourth layer have light reflectivity,
each central wavelength of reflected light of the first layer to the fourth layer is within any range of 430 to 480 nm, 520 to 570 nm, 570 to 620 nm, or 620 to 670 nm,
a sign of Rth of the first layer at a wavelength of 550 nm is opposite to a sign of Rth of the second layer at a wavelength of 550 nm, and
a sign of Rth of the third layer at a wavelength of 550 nm is opposite to a sign of Rth of the fourth layer at a wavelength of 550 nm.

Figure 3:
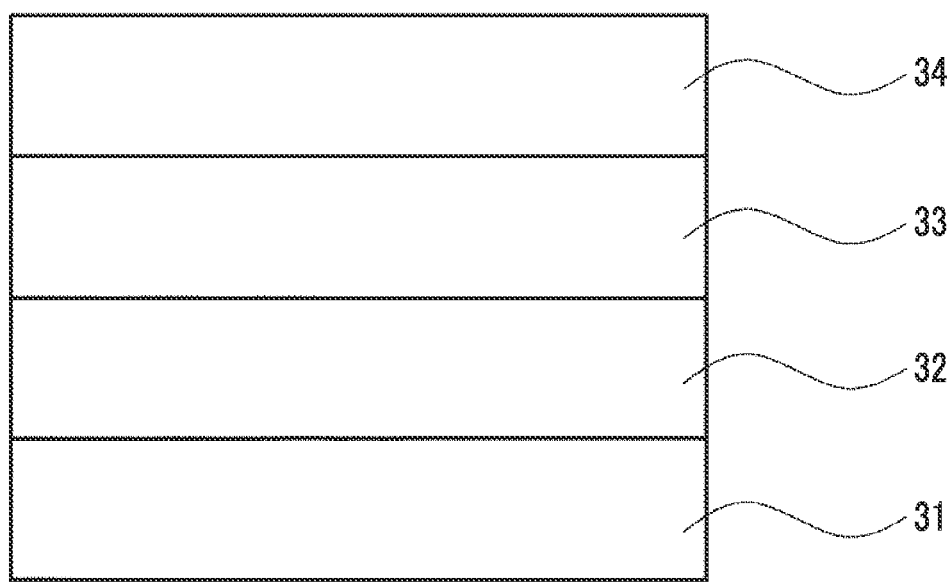
FIG. 3 is a schematic diagram showing an example of an optical laminate according to a second embodiment of the present invention.

The optical laminate according to the second embodiment of the present invention will be described with reference to the accompanying drawing. FIG. 3 is a schematic cross-sectional view showing an example of a configuration of an optical laminate 12 according to the second embodiment.

In the optical laminate 12 of the aspect shown in FIG. 3, a first layer 31, a second layer 32, a third layer 33, and a fourth layer 34 are laminated in this order, and each of the above-described requirements is satisfied. The sign of Rth of the first layer 31 is opposite to the sign of Rth of the second layer 32, and the sign of Rth of the third layer 33 is opposite to the sign of Rth of the fourth layer 34.

The optical laminate according to the second embodiment of the present invention can be used for a reflective circular polarizer. In a case where the optical laminate has the above-described configuration, since the Rth of the first layer is cancelled out with the Rth of the second layer, and the Rth of the third layer is cancelled out with the Rth of the fourth layer, occurrence of a ghost can be suppressed even for incidence ray from an oblique direction.

Hereinafter, the second embodiment according to the present invention will be described in detail.

[First Layer to Fourth Layer]

The optical laminate according to the second embodiment of the present invention includes, in the following order, the first layer, the second layer, the third layer, and the fourth layer.

The first layer to fourth layer described above are cholesteric liquid crystal layers having light reflectivity.

The above-described cholesteric liquid crystal layer refers to a layer in which a liquid crystal compound forms a cholesteric liquid crystalline phase and the cholesteric liquid crystalline phase is immobilized. As such a cholesteric liquid crystal layer, a known cholesteric liquid crystal layer can be used, and for example, those described in JP2020-060627A and the like can be used.

The above-described cholesteric liquid crystal layer is preferably a cholesteric liquid crystal layer formed of a rod-like liquid crystal compound or a cholesteric liquid crystal layer formed of a disk-like liquid crystal compound. In the cholesteric liquid crystal layer formed of a rod-like liquid crystal compound, Rth tends to be a positive value, and in the cholesteric liquid crystal layer formed of a disk-like liquid crystal compound, Rth tends to be a negative value.

In addition, each central wavelength of reflected light of the first layer to the fourth layer is within any range of 430 to 480 nm, 520 to 570 nm, 570 to 620 nm, or 620 to 670 nm. It is also preferable that the central wavelengths of the reflected light of the first layer to the fourth layer are different from each other.

In a case where a layer has a central wavelength of reflected light at 430 to 480 nm, the layer can correspond to the blue light reflecting layer described in the first embodiment. In this case, a reflectivity at the central wavelength of the reflected light is preferably 40% or more and less than 50%.

In a case where a layer has a central wavelength of reflected light at 520 to 570 nm, the layer can correspond to the green light reflecting layer described in the first embodiment. In this case, a reflectivity at the central wavelength of the reflected light is preferably 40% or more and less than 50%.

In a case where a layer has a central wavelength of reflected light at 570 to 620 nm, the layer can correspond to the yellow light reflecting layer described in the first embodiment. In this case, a reflectivity at the central wavelength of the reflected light is preferably 40% or more and less than 50%.

In a case where a layer has a central wavelength of reflected light at 620 to 670 nm, the layer can correspond to the red light reflecting layer described in the first embodiment. In this case, a reflectivity at the central wavelength of the reflected light is preferably 40% or more and less than 50%.

A method for measuring the reflectivity is as described above.

It is sufficient that each central wavelength of the reflected light of the first layer to the fourth layer is within any of the above-described wavelength range, but it is preferable that the central wavelength of the reflected light of one of the first layer and the fourth layer is in the range of 430 to 480 nm and the central wavelength of the reflected light of the other is in the range of 620 to 670 nm.

In addition, it is also preferable that the central wavelength of the reflected light of the first layer is in the range of 430 to 480 nm, the central wavelength of the reflected light of the second layer is in the range of 520 to 570 nm, the central wavelength of the reflected light of the third layer is in the range of 570 to 620 nm, and the central wavelength of the reflected light of the fourth layer is in the range of 620 to 670 nm.

That is, it is also preferable that the first layer corresponds to the blue light reflecting layer, the second layer corresponds to the green light reflecting layer, the third layer corresponds to the yellow light reflecting layer, and the fourth layer corresponds to the red light reflecting layer.

In addition, in a case where the optical laminate having the above-described lamination order is applied to a reflective circular polarizer described later, in the reflective layer on the long wavelength side (for example, in the red light reflecting layer), the thickness of the reflective layer required to obtain sufficient reflectivity increases, and Rth of the reflective layer itself has a greater effect on light transmitted through the reflective layer. From this viewpoint, it is preferable that a reflective layer arranged on a light source side is the reflective layer on the short wavelength side (for example, the blue light reflecting layer).

In the optical laminate according to the second embodiment of the present invention, the sign of Rth of the first layer at a wavelength of 550 nm is opposite to the sign of Rth of the second layer at a wavelength of 550 nm, and the sign of Rth of the third layer at a wavelength of 550 nm is opposite to the sign of Rth of the fourth layer at a wavelength of 550 nm.

A method of setting the sign of Rth of the first layer and the sign of Rth of the second layer to be opposite to each other is not particularly limited, and examples of an aspect of such Rth relationship include an aspect in which one of the first layer and the second layer is a cholesteric liquid crystal layer formed of a rod-like liquid crystal compound and the other is a cholesteric liquid crystal layer formed of a disk-like liquid crystal compound.

Similarly, a method of setting the sign of Rth of the third layer and the sign of Rth of the fourth layer to be opposite to each other is not particularly limited, and examples of an aspect of such Rth relationship include an aspect in which one of the third layer and the fourth layer is a cholesteric liquid crystal layer formed of a rod-like liquid crystal compound and the other is a cholesteric liquid crystal layer formed of a disk-like liquid crystal compound.

In addition, it is also preferable that the sign of Rth of the second layer is opposite to the sign of Rth of the third layer. Examples of an aspect of such Rth relationship include an aspect in which the first layer and the third layer are cholesteric liquid crystal layers formed of a rod-like liquid crystal compound, and the second layer and the fourth layer are cholesteric liquid crystal layers formed of a disk-like liquid crystal compound, and an aspect in which the first layer and the third layer are cholesteric liquid crystal layers formed of a disk-like liquid crystal compound, and the second layer and the fourth layer are cholesteric liquid crystal layers formed of a rod-like liquid crystal compound.

Each thickness of the first layer to the fourth layer is preferably 0.1 µm or more, more preferably 0.2 µm or more, and still more preferably 0.3 µm or more. From the viewpoint that the ghost can be suppressed more, each thickness of the first layer to the fourth layer is preferably 10.0 µm or less, more preferably 7.0 µm or less, and still more preferably 5.0 µm or less.

The thicknesses of the first layer to the fourth layer can be measured by producing a cross section of the optical laminate and observing the cross section with a transmission electron microscope.

In addition, in the optical laminate according to the second embodiment, it is also preferable that each absolute value of $SRth_i$ described in the optical laminate according to the first embodiment is within the above-described range. In the definition described in the optical laminate according to the first embodiment, n is read as 4.

Specifically, the absolute value of the $SRth_i$ is preferably 0.3 µm or less, more preferably 0.2 µm or less, and still more preferably 0.1 µm or less.

It is considered that, by setting the $SRth_i$ to be within the above-described preferred range, a retardation which occurs in a case where light is transmitted through each reflective layer can be reduced, and the occurrence of the ghost can be further suppressed even for incidence ray from an oblique direction.

In the optical laminate according to the second embodiment of the present invention, each of the first layer to the fourth layer may be laminated in a state of being in direct contact with each other, or may be laminated through other layers. The other layers are not particularly limited, and examples thereof include an adhesion layer (for example, an adhesive layer, a pressure sensitive adhesive layer, and the like), a refractive index adjusting layer, a resin film, a positive C-plate, and an alignment layer. Among these, it is preferable that each of the first layer to the fourth layer is laminated in direct contact with each other.

In addition, in the optical laminate according to the second embodiment of the present invention, in a case where the first layer to the fourth layer are laminated in direct contact with each other, in order to reduce a difference in refractive index, it is preferable that the first layer to the fourth layer are arranged such that an alignment direction (slow axis direction) of the liquid crystal compound (the rod-like liquid crystal compound or the disk-like liquid crystal compound) changes continuously at an interface. For the above-described arrangement, for example, in a case where the second layer which is a cholesteric liquid crystal layer formed of a rod-like liquid crystal compound is formed on the first layer which is a cholesteric liquid crystal layer formed of a disk-like liquid crystal compound, a coating liquid containing a rod-like liquid crystal compound is directly applied on the first layer, and the slow axis direction can be aligned while continuous changing at the interface by alignment regulating force of the disk-like liquid crystal compound contained in the first layer.

A thickness of the optical laminate according to the second embodiment of the present invention is preferably 30 µm or less and more preferably 15 µm or less.

The lower limit thereof is not particularly limited, but is, for example, 1 µm or more, preferably 5 µm or more.

A manufacturing method of the optical laminate according to the second embodiment of the present invention, a laminated optical film formed using the optical laminate, and the like will be described later.

Third Embodiment

The optical laminate according to the third embodiment of the present invention includes, in the following order, a first layer, a second layer, and a third layer,
in which all of the first layer to the third layer are cholesteric liquid crystal layers,
the second layer is a pitch gradient layer in which a helical pitch changes in a film thickness direction,
all of the first layer to the third layer have light reflectivity, each central wavelength of reflected light of the first layer to the third layer is within any range of 430 to 480 nm, 520 to 620 nm, or 620 to 670 nm, a sign of a retardation in a film thickness direction of the first layer at a wavelength of 550 nm is opposite to a sign of a retardation in the film thickness direction of the second layer at a wavelength of 550 nm, and the sign of the retardation in the film thickness direction of the second layer at a wavelength of 550 nm is opposite to a sign of a retardation in the film thickness direction of the third layer at a wavelength of 550 nm.

Figure 4:
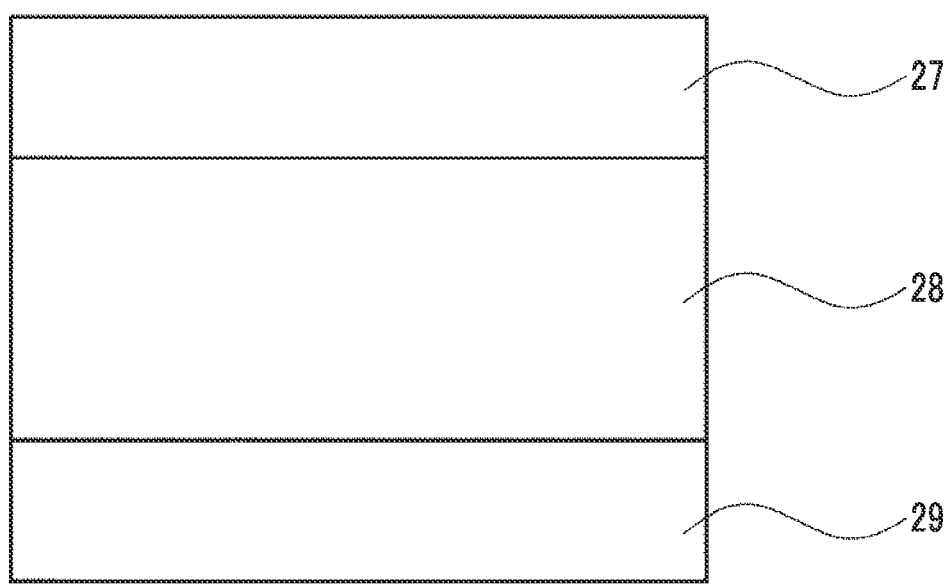
FIG. 4 is a schematic diagram showing an example of an optical laminate according to a third embodiment of the present invention.

The optical laminate according to the third embodiment of the present invention will be described with reference to the accompanying drawing. FIG. 4 is a schematic cross-sectional view showing an example of a configuration of an optical laminate 13 according to the third embodiment.

In the optical laminate 13 of the aspect shown in FIG. 3, a first layer 27, a second layer 28, and a third layer 29 are laminated in this order, and each of the above-described requirements is satisfied. The sign of Rth of the first layer 27 is opposite to the sign of Rth of the second layer 28, and the sign of Rth of the second layer 28 is opposite to the sign of Rth of the third layer 29.

The optical laminate according to the third embodiment of the present invention can be used for a reflective circular polarizer. In a case where the optical laminate has the above-described configuration, since the Rth of the first layer is cancelled out with the Rth of the second layer and the Rth of the second layer is cancelled out with the Rth of the third layer, occurrence of a ghost can be suppressed even for incidence ray from an oblique direction.

Hereinafter, the third embodiment according to the present invention will be described in detail.

[First Layer to Third Layer]

The optical laminate according to the third embodiment of the present invention includes, in the following order, the first layer, the second layer, and the third layer.

The first layer to third layer described above are cholesteric liquid crystal layers having light reflectivity.

The above-described cholesteric liquid crystal layer refers to a layer in which a liquid crystal compound forms a cholesteric liquid crystalline phase and the cholesteric liquid crystalline phase is immobilized. As such a cholesteric liquid crystal layer, the cholesteric liquid crystal layer used for the first layer to the fourth layer of the second embodiment can be used.

The above-described cholesteric liquid crystal layer is preferably a cholesteric liquid crystal layer formed of a rod-like liquid crystal compound or a cholesteric liquid crystal layer formed of a disk-like liquid crystal compound. In the cholesteric liquid crystal layer formed of a rod-like liquid crystal compound, Rth tends to be a positive value, and in the cholesteric liquid crystal layer formed of a disk-like liquid crystal compound, Rth tends to be a negative value.

The second layer is a pitch gradient layer in which a helical pitch changes in a film thickness direction. The pitch gradient layer can be produced using a known method, and for example, JP2020-060627A and the like can be referred to.

In the pitch gradient layer, since the helical pitch changes in the film thickness direction, light in a plurality of wavelength ranges can be reflected.

In addition, each central wavelength of reflected light of the first layer to the third layer is within any range of 430 to 480 nm, 520 to 620 nm, or 620 to 670 nm. It is also preferable that the central wavelengths of the reflected light of the first layer to the third layer are different from each other.

In a case where a layer has a central wavelength of reflected light at 430 to 480 nm, the layer can correspond to the blue light reflecting layer described in the first embodiment. In this case, a reflectivity at the central wavelength of the reflected light is preferably 40% or more and less than 50%.

In a case where a layer has a central wavelength of reflected light at 520 to 620 nm, the layer can correspond to the green light reflecting layer or yellow light reflecting layer described in the first embodiment. In this case, a reflectivity at the central wavelength of the reflected light is preferably 40% or more and less than 50%.

In a case where a layer has a central wavelength of reflected light at 620 to 670 nm, the layer can correspond to the red light reflecting layer described in the first embodiment. In this case, a reflectivity at the central wavelength of the reflected light is preferably 40% or more and less than 50%.

A method for measuring the reflectivity is as described above.

It is sufficient that each central wavelength of the reflected light of the first layer to the third layer is within any of the above-described wavelength range, but it is also preferable that the central wavelength of the reflected light of the first layer is in the range of 430 to 480 nm, the central wavelength of the reflected light of the second layer is in the range of 520 to 620 nm, and the central wavelength of the reflected light of the third layer is in the range of 620 to 670 nm.

That is, it is also preferable that the first layer corresponds to the blue light reflecting layer, the second layer corresponds to the green light reflecting layer or the yellow light reflecting layer, and the third layer corresponds to the red light reflecting layer. Since the second layer is the pitch gradient layer, the functions of the green light reflecting layer and the yellow light reflecting layer can be exhibited with one layer.

In addition, in a case where the optical laminate having the above-described lamination order is applied to a reflective circular polarizer described later, in the reflective layer on the long wavelength side (for example, in the red light reflecting layer), the thickness of the reflective layer required to obtain sufficient reflectivity increases, and Rth of the reflective layer itself has a greater effect on light transmitted through the reflective layer. From this viewpoint, it is preferable that a reflective layer arranged on a light source side is the reflective layer on the short wavelength side (for example, the blue light reflecting layer).

In the optical laminate according to the third embodiment of the present invention, the sign of Rth of the first layer at a wavelength of 550 nm is opposite to the sign of Rth of the second layer at a wavelength of 550 nm, and the sign of Rth of the second layer at a wavelength of 550 nm is opposite to the sign of Rth of the third layer at a wavelength of 550 nm.

A method of setting the sign of Rth of the first layer and the sign of Rth of the second layer to be opposite to each other and setting the sign of Rth of the second layer and the sign of Rth of the third layer to be opposite to each other is not particularly limited, and examples of an aspect of such Rth relationship include an aspect in which the first layer is a cholesteric liquid crystal layer formed of a rod-like liquid crystal compound, the second layer is a cholesteric liquid crystal layer formed of a disk-like liquid crystal compound, and the third layer is a cholesteric liquid crystal layer formed of a rod-like liquid crystal compound. In addition, examples of the aspect of such Rth relationship also include an aspect in which the first layer is a cholesteric liquid crystal layer formed of a disk-like liquid crystal compound, the second layer is a cholesteric liquid crystal layer formed of a rod-like liquid crystal compound, and the third layer is a cholesteric liquid crystal layer formed of a disk-like liquid crystal compound.

In addition, in the optical laminate according to the third embodiment, it is also preferable that each absolute value of $SRth_i$ described in the optical laminate according to the first embodiment is within the above-described range. In the definition described in the optical laminate according to the first embodiment, n is read as 3.

Specifically, the absolute value of the $SRth_i$ is preferably 0.3 μm or less, more preferably 0.2 μm or less, and still more preferably 0.1 μm or less.

It is considered that, by setting the $SRth_i$ to be within the above-described preferred range, a retardation which occurs in a case where light is transmitted through each reflective layer can be reduced, and the occurrence of the ghost can be further suppressed even for incidence ray from an oblique direction.

In the optical laminate according to the third embodiment of the present invention, each of the first layer to the third layer may be laminated in a state of being in direct contact with each other, or may be laminated through other layers. The other layers are not particularly limited, and examples thereof include an adhesion layer (for example, an adhesive layer, a pressure sensitive adhesive layer, and the like), a refractive index adjusting layer, a resin film, a positive C-plate, and an alignment layer. Among these, it is preferable that each of the first layer to the third layer is laminated in direct contact with each other.

In addition, in the optical laminate according to the third embodiment of the present invention, in a case where the first layer to the third layer are laminated in direct contact with each other, in order to reduce a difference in refractive index, it is preferable that the first layer to the third layer are arranged such that an alignment direction (slow axis direction) of the liquid crystal compound (the rod-like liquid crystal compound or the disk-like liquid crystal compound) changes continuously at an interface. For the above-described arrangement, for example, in a case where the second layer which is a cholesteric liquid crystal layer formed of a rod-like liquid crystal compound is formed on the first layer which is a cholesteric liquid crystal layer formed of a disk-like liquid crystal compound, a coating liquid containing a rod-like liquid crystal compound is directly applied on the first layer, and the slow axis direction can be aligned while continuous changing at the interface by alignment regulating force of the disk-like liquid crystal compound contained in the first layer.

A thickness of the optical laminate according to the third embodiment of the present invention is preferably 30 μm or less and more preferably 15 μm or less.

The lower limit thereof is not particularly limited, but is, for example, 1 μm or more, preferably 5 μm or more.

A manufacturing method of the optical laminate according to the third embodiment of the present invention, a laminated optical film formed using the optical laminate, and the like will be described later.

[Manufacturing Method of Optical Laminate]

The optical laminate according to the present invention (the first embodiment, the second embodiment, and the third embodiment) can be manufactured by a known method, and the method is not particularly limited.

For example, examples of a manufacturing method of the optical laminates according to the first embodiment and the second embodiment include a method in which a first cholesteric liquid crystal layer is formed by applying a composition containing a rod-like liquid crystal compound onto a base material, forming a cholesteric liquid crystalline phase, and fixing an alignment state of the cholesteric liquid crystalline phase, a second cholesteric liquid crystal layer is formed by applying a composition containing a disk-like liquid crystal compound onto the first cholesteric liquid crystal layer, forming a cholesteric liquid crystalline phase, and fixing an alignment state of the cholesteric liquid crystalline phase, a third cholesteric liquid crystal layer is formed on the second cholesteric liquid crystal layer in the same manner as the first cholesteric liquid crystal layer, and a fourth cholesteric liquid crystal layer is formed on the third cholesteric liquid crystal layer in the same manner as the second cholesteric liquid crystal layer.

The above-described first cholesteric liquid crystal layer and third cholesteric liquid crystal layer correspond to the reflective layer A of the first embodiment, and the above-described second cholesteric liquid crystal layer and fourth cholesteric liquid crystal layer correspond to the reflective layer B of the first embodiment. In addition, the above-described first cholesteric liquid crystal layer to fourth cholesteric liquid crystal layer correspond to the first layer to the fourth layer of the second embodiment, respectively.

In addition, examples of a manufacturing method of the optical laminate according to the third embodiment include a method in which a first cholesteric liquid crystal layer is formed on a base material in the same manner as described above, a second cholesteric liquid crystal layer (pitch gradient layer) is formed on the first cholesteric liquid crystal layer with reference to the above-described method, and a third cholesteric liquid crystal layer is formed on the second cholesteric liquid crystal layer in the same manner as the first cholesteric liquid crystal layer.

The above-described first cholesteric liquid crystal layer to third cholesteric liquid crystal layer correspond to the first layer to the third layer of the third embodiment, respectively.

In addition, in a case where the optical laminate according to the embodiment of the present invention is used for a reflective circular polarizer and the reflective circular polarizer is stretched or molded, since a reflection wavelength range of the reflective circular polarizer may be shifted to a short wavelength side, it is preferable to manufacture the optical laminate assuming the wavelength shift of the reflection wavelength range in advance. For example, in a case where an optical laminate including a layer formed by immobilizing the cholesteric liquid crystalline phase is used as the reflective circular polarizer, the optical laminate is stretched by being stretched or molded and thus a helical pitch of the cholesteric liquid crystalline phase may be reduced. Therefore, it is preferable that the helical pitch of the cholesteric liquid crystalline phase is set to be large in advance. In addition, it is also preferable that the optical laminate includes an infrared light reflecting layer having a reflectivity of 40% or more at a wavelength of 800 nm in consideration of the shift of the reflection wavelength range to the short wavelength side due to the stretching or the molding.

Furthermore, in a case where a stretching ratio in the stretching or molding is not uniform in a plane, the optical laminate may be manufactured by selecting an appropriate reflection wavelength range according to the wavelength shift due to stretching at each location in the plane of the optical laminate. That is, the optical laminate may have regions with different reflection wavelength ranges in the plane. In addition, it is also preferable that the reflection wavelength range is set wider than the required wavelength range in advance in consideration that the stretching ratios at the respective locations in the plane of the optical laminate are different from each other.

In the above, the method of forming the cholesteric liquid crystal layer by directly applying the above-described composition onto each cholesteric liquid crystal layer has been described, but the optical laminate may be formed by applying each cholesteric liquid crystal layer onto a separate base material and then laminating the cholesteric liquid crystal layers through an adhesion layer (for example, an adhesive layer or a pressure-sensitive adhesive layer).

Any commercially available pressure sensitive adhesive can be used as a pressure sensitive adhesive for the above-described pressure-sensitive adhesive layer, but from the viewpoint of thinning and viewpoint of reducing a surface roughness Ra of the reflective circular polarizer as the optical laminate, a thickness thereof is preferably 25 µm or less, more preferably 15 µm or less, and still more preferably 6 µm or less. In addition, a pressure sensitive adhesive which is unlikely to generate outgas is preferable as the pressure sensitive adhesive. Particularly, in a case of performing stretching or molding, a vacuum process or a heating process may be performed, and it is preferable that no outgas is generated even under such conditions.

A commercially available adhesive can be optionally used as the adhesive for the above-described adhesive layer, and for example, an epoxy resin-based adhesive or an acrylic resin-based adhesive can be used.

From the viewpoint of thinning and viewpoint of reducing a surface roughness Ra of the reflective circular polarizer as the optical laminate, a thickness of the adhesive is preferably 25 µm or less, more preferably 5 µm or less, and still more preferably 1 µm or less. In addition, from the viewpoint of reducing the thickness of the adhesive layer and coating an adherend with the adhesive such that the thickness thereof is uniform, a viscosity of the adhesive is preferably 300 cP or less and more preferably 100 cP or less.

In addition, in a case where the adherend has surface unevenness, from the viewpoint of reducing the surface roughness Ra of the reflective circular polarizer as the optical laminate, an appropriate viscoelasticity or an appropriate thickness of the pressure sensitive adhesive or the adhesive can also be selected so that the surface unevenness of the layer to be bonded can be embedded. From the viewpoint of embedding the surface unevenness, it is preferable that the pressure sensitive adhesive or the adhesive has a viscosity of 50 cP or more. In addition, it is preferable that the thickness thereof is more than a height of the surface unevenness.

Examples of a method of adjusting the viscosity of the adhesive include a method of using an adhesive containing a solvent. In this case, the viscosity of the adhesive can be adjusted by a proportion of the solvent. In addition, the thickness of the adhesive can be further reduced by drying the solvent after coating the adherend with the adhesive.

In the reflective circular polarizer as the optical laminate, from the viewpoint of reducing reflection at the interface and suppressing a decrease in polarization degree of transmitted light, it is preferable that the pressure sensitive adhesive or adhesive used for adhering each layer has a small difference in refractive index with adjacent layers. Since the cholesteric liquid crystal layer has birefringence, refractive indices differ between a fast axis direction and a slow axis direction. In a case where an average refractive index $n_{ave}$ of a liquid crystal layer is obtained by adding the refractive indices in the fast axis direction and the slow axis direction and dividing by 2, a difference between a refractive index of the adjacent pressure-sensitive adhesive layer or adhesive layer and $n_{ave}$ is preferably 0.075 or less, more preferably 0.05 or less, and still more preferably 0.025 or less. The refractive index of the pressure sensitive adhesive or the adhesive can be adjusted, for example, by mixing fine particles of titanium oxide, fine particles of zirconia, or the like.

In addition, in the adhesive layer between the layers, it is also preferable that a thickness of the adhesive layer is 100 nm or less. In a case where the thickness of the adhesive layer is 100 nm or less, light in the visible region is less likely to be affected by the difference in refractive index, and extra reflection can be suppressed. The thickness of the adhesive layer is more preferably 50 nm or less and still more preferably 30 nm or less. Examples of a method of forming the adhesive layer having a thickness of 100 nm or less include a method of vapor-depositing a ceramic adhesive such as silicon oxide (SiOx layer) on the bonding surface. For the bonding surface of the bonding member, before the bonding, for example, a surface reforming treatment such as a plasma treatment, a corona treatment, and a saponification treatment can be performed, and a primer layer can be applied. In addition, in a case where a plurality of bonding surfaces are present, the kind and thickness of the adhesive layer can be adjusted for each of the bonding surfaces. Specifically, for example, the adhesive layer having a thickness of 100 nm or less can be provided by the procedures (1) to (3) described below.

(1) A layer to laminate is bonded to a temporary support consisting of a glass base material.

(2) A SiOx layer having a thickness of 100 nm or less is formed on both the surface of the layer to laminate and the surface of the layer to be laminated by vapor deposition or the like; the vapor deposition can be carried out by, for example, a vapor deposition device (model number ULEYES, manufactured by ULVAC, Inc.) using SiOx powder as a vapor deposition source; in addition, it is preferable that the surface of the formed SiOx layer is subjected to a plasma treatment.

(3) After the formed SiOx layers are bonded to each other, the temporary support is peeled off; it is preferable that the bonding is carried out, for example, at a temperature of 120° C.

The application, the adhesion, or the bonding of the layers may be carried out by a roll-to-roll or single-wafer method.

The roll-to-roll method is preferable from the viewpoint of improving the productivity and reducing axis misalignment of each layer.

Meanwhile, the single-wafer method is preferable from the viewpoints that this method is suitable for production of many kinds in small quantities and that a special adhesion method in which the thickness of the adhesive layer is 100 nm or less can be selected.

In addition, examples of the method of coating the adherend with the adhesive include known methods such as a roll coating method, a gravure printing method, a spin coating method, a wire bar coating method, an extrusion coating method, a direct gravure coating method, a reverse gravure coating method, a die coating method, a spraying method, and an ink jet method.

The reflective circular polarizer as the optical laminate according to the embodiment of the present invention may include a support, an alignment, or the like, but the support and the alignment layer may be a temporary support which is peeled off and removed during the production of a laminated optical film described later. It is preferable that a temporary support is used from the viewpoint that the thickness of the laminated optical film can be reduced by transferring the reflective circular polarizer to another laminate and peeling and removing the temporary support and the adverse effect of the retardation of the temporary support on the polarization degree of transmitted light can be eliminated.

The type of the support is not particularly limited, but it is preferable that the support is transparent to visible light, and examples thereof include films made of cellulose acylate, polycarbonate, polysulfone, polyethersulfone, polyacrylate and polymethacrylate, cyclic polyolefin, polyolefin, polyamide, polystyrene, polyester, or the like. Among these, a cellulose acylate film, cyclic polyolefin, polyacrylate, or polymethacrylate is preferable. In addition, commercially available cellulose acetate films (for example, "TD80U" or "Z-TAC" manufactured by FUJIFILM Corporation) can also be used.

In a case where the support is a temporary support, a support having high tear strength is preferable from the viewpoint of preventing breakage during peeling. For example, a polycarbonate-based film, a polyester-based film, or the like is preferable.

In addition, from the viewpoint of suppressing the adverse effect on the polarization degree of transmitted light, it is preferable that the support has a small retardation. Specifically, a magnitude of Re at 550 nm is preferably 10 nm or less, and an absolute value of a magnitude of Rth is preferably 50 nm or less. In addition, even in a case where the support is used as the above-described temporary support, it is preferable that the temporary support has a small retardation from the viewpoint of performing quality inspection of the reflective circular polarizer or other laminates in a step of manufacturing a laminated optical film, which will be described later.

In addition, it is preferable that the reflective circular polarizer as the optical laminate, which is used in the laminated optical film described below, is transparent to near-infrared light in order to minimize the influence on various sensors incorporated in optical systems such as a virtual reality display device and an electronic finder, in which near-infrared light for eye tracking, facial expression recognition, and iris recognition is used as a light source.

[Laminated Optical Film]

The laminated optical film according to the embodiment of the present invention includes, in the following order, at least a reflective circular polarizer, a retardation layer which converts circularly polarized light into linearly polarized light, and a linear polarizer.

As the above-described reflective circular polarizer, the above-described optical laminate (according to the first embodiment, the second embodiment, or the third embodiment) is used. Preferred aspects of the optical laminate (according to the first embodiment, the second embodiment, or the third embodiment) are as described above.

As a suitable use example of the reflective circular polarizer of the present invention and the laminated optical film including the reflective circular polarizer, a virtual reality display device using the laminated optical film according to the embodiment of the present invention is exemplified, and actions of the laminated optical film according to the embodiment of the present invention will be described in detail.

Figure 5:
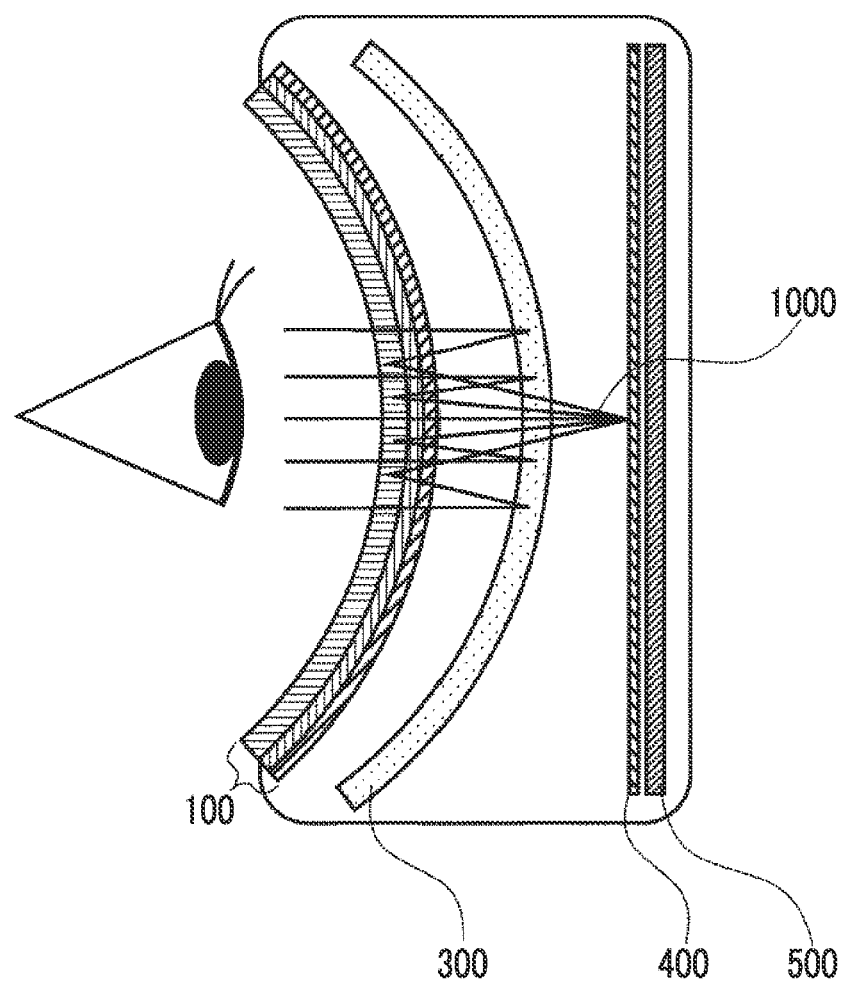
FIG. 5 is an example of a virtual reality display device formed using a laminated optical film according to an embodiment of the present invention.

FIG. 5 is a schematic diagram of the virtual reality display device formed using the laminated optical film according to the embodiment of the present invention. In the virtual reality display device of the aspect shown in FIG. 5, a laminated optical film 100 having the reflective circular polarizer as the above-described optical laminate, a half mirror 300, a circularly polarizing plate 400, and an image display panel 500 are arranged in this order from a viewing side. As shown in FIG. 5, a ray 1000 emitted from the image display panel 500 is transmitted through the circularly polarizing plate 400 to be converted into circularly polarized light, and is transmitted through the half mirror 300. Next, the light is incident on the laminated optical film 100 according to the embodiment of the present invention from a side of the reflective circular polarizer, is totally reflected, is reflected by the half mirror 300 again, and is incident on the laminated optical film 100 again. Here, since the ray 1000 is reflected by the half mirror, the ray 1000 is converted into circularly polarized light having a turning direction opposite to that of the circularly polarized light in a case of incidence on the laminated optical film 100 for the first time. Therefore, the ray 1000 is transmitted through the laminated optical film 100 and visually recognized by a user. In addition, in a case where the ray 1000 is reflected by the half mirror 300, since the half mirror has a concave mirror shape, an image displayed on the image display panel 500 is magnified so that the user can visually recognize the magnified virtual image. The system described above is referred to as a reciprocating optical system, a folded optical system, or the like.

Figure 6:
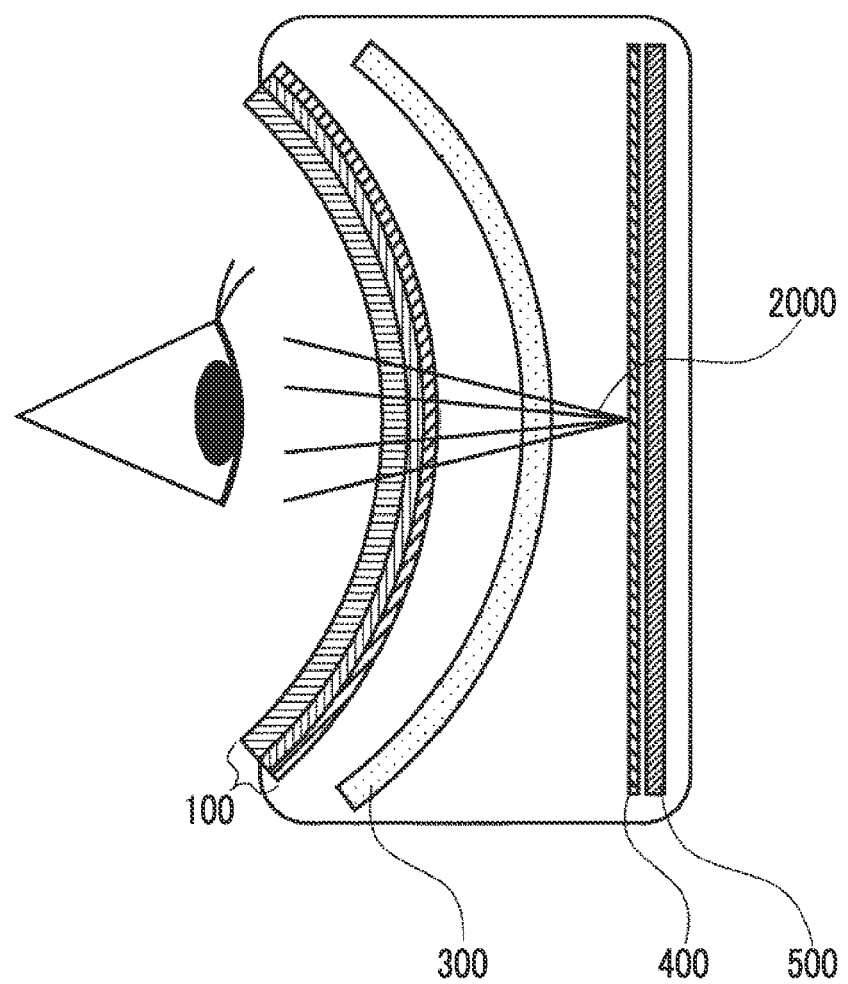
FIG. 6 is an example of a virtual reality display device formed using the laminated optical film according to the embodiment of the present invention.

On the other hand, FIG. 6 is a schematic diagram for explaining a case where the ghost occurs in the virtual reality display device shown in FIG. 5. More specifically, FIG. 6 is a schematic diagram showing a case where a ray 2000 is transmitted without being reflected and becomes leakage light in a case where the ray 2000 is incident on the laminated optical film 100 for the first time in the virtual reality display device. As shown in FIG. 6, in a case where the ray 2000 is incident on the laminated optical film 100 for the first time, is transmitted without being reflected, and leakage light is generated, as can be seen from FIG. 6, the user visually recognizes an unenlarged image. This image is referred to as the ghost or the like, and the ghost or the like is required to be reduced.

Since the laminated optical film 100 according to the embodiment of the present invention has a high polarization degree, leakage of transmitted light (that is, the ghost) in a case where a ray is incident on the laminated optical film 100 for the first time can be reduced.

In addition, since the laminated optical film 100 according to the embodiment of the present invention has a high polarization degree with respect to the transmitted light, it is possible to increase the transmittance in a case where the ray is incidence on the laminated optical film 100 for the second time, and it is possible to improve brightness of the virtual image and further suppress tint of the virtual image.

As shown in FIGS. 5 and 6, the laminated optical film 100 may be molded on a curved surface of a lens or the like.

Since the optical film of the related art obtained by laminating a reflective linear polarizer and a retardation layer having a retardation of a ¼ wavelength, which is known as a reflective circular polarizer in the related art, has optical axes such as a transmission axis, a reflection axis, and a slow axis, the optical axes are distorted in a case of being stretched or molded into a curved shape, and thus the polarization degree of the transmitted light is decreased. On the contrary, in the laminated optical film 100 according to the embodiment of the present invention, since the reflective circular polarizer (optical laminate) has no optical axis, a decrease in polarization degree due to stretching or molding is unlikely to occur. Therefore, even in a case where the laminated optical film 100 is formed into a curved surface shape, the decrease in polarization degree is unlikely to occur.

Figure 7:
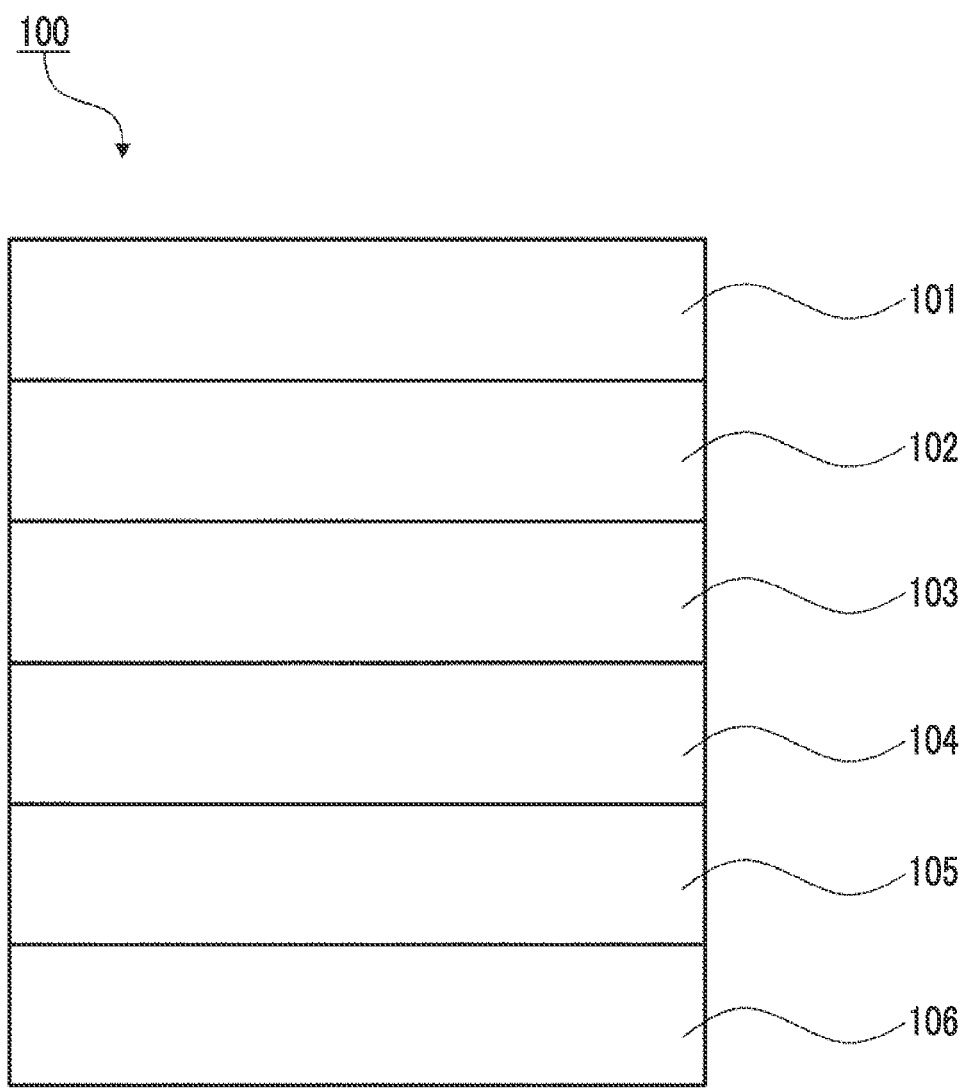
FIG. 7 is a schematic view showing an example of the laminated optical film according to the embodiment of the present invention.

FIG. 7 shows an example of a layer configuration of a laminated optical film 100 according to the embodiment of the present invention. In the laminated optical film 100 shown in FIG. 7, an antireflection layer 101, a positive C-plate 102, a reflective circular polarizer 103, a positive C-plate 104, a retardation layer 105, and a linear polarizer 106 are arranged in this order. As described above, the above-described optical laminate is used as the reflective circular polarizer 103. In the aspect shown in FIG. 7, the antireflection layer 101, the positive C-plate 102, and the positive C-plate 104 are used, but a part or the whole of the above-described configuration may be omitted.

Since the laminated optical film according to the embodiment of the present invention includes the reflective circular polarizer 103, the retardation layer 105 which converts circularly polarized light into linearly polarized light, and the linear polarizer 106 in this order, leakage light from the reflective circular polarizer 103 is converted into the linearly polarized light, and the light can be absorbed by the linear polarizer. Therefore, the polarization degree of the transmitted light can be increased. In a case where the laminated optical film is stretched or molded, the slow axis of the retardation layer or the absorption axis of the linear polarizer may be distorted. However, as described above, the reflective circular polarizer maintains a high polarization degree even after being stretched or molded, and the amount of leakage light from the reflective circular polarizer is small, the increase in leakage light is suppressed to a slight amount.

In addition, it is preferable that a surface roughness Ra of the laminated optical film according to the embodiment of the present invention is 100 nm or less. In a case where the Ra is small, sharpness of the image can be improved, for example, in a case where the laminated optical film is used in the virtual reality display device or the like. The present inventors have presumed that, in a case where the light is reflected on the laminated optical film, an angle of the reflected light is distorted in a case where the laminated optical film has unevenness, which leads to image distortion and blurriness. The Ra of the laminated optical film is more preferably 50 nm or less, still more preferably 30 nm or less, and particularly preferably 10 nm or less.

In addition, the laminated optical film according to the embodiment of the present invention is produced by laminating a plurality of layers. According to the studies conducted by the present inventors, it has been found that, in a case where a layer is laminated on a layer with unevenness, the unevenness may be amplified. Therefore, in the laminated optical film according to the embodiment of the present invention, it is preferable that all the layers have a small Ra. Each layer of the laminated optical film according to the embodiment of the present invention has an Ra of preferably 50 nm or less, more preferably 30 nm or less, and still more preferably 10 nm or less.

In addition, from the viewpoint of increasing the image sharpness of the reflected image, it is particularly preferable that the reflective circular polarizer has a small surface roughness Ra.

The surface roughness Ra can be measured by, for example, a non-contact surface/layer cross-sectional shape measuring system VertScan (manufactured by Ryoka System, Inc.). Since the Vertscan is a surface shape measurement method using a phase of reflected light from a sample, in a case of measuring a reflective circular polarizer consisting of a reflective layer obtained by immobilizing a cholesteric liquid crystalline phase (the above-described optical laminate), the reflected light from inside the film may overlap, which makes it possible to accurately measure the surface shape. In this case, a metal layer may be formed on the surface of the sample to increase the reflectivity of the surface and further suppress the reflection from the inside. As a method of forming the metal layer on the surface of the sample, for example, a sputtering method is used. Au, Al, Pt, or the like is used as a material to be sputtered.

It is preferable that the number of point defects per unit area in the laminated optical film according to the embodiment of the present invention is small. Since the laminated optical film according to the embodiment of the present invention is produced by laminating a large number of layers, it is preferable that the number of point defects in each layer is also small in order to reduce the number of point defects in the entire laminated optical film. Specifically, the number of point defects in each layer is preferably 20 or less, more preferably 10 or less, and still more preferably 1 or less per square meter. The number of point defects in the entire laminated optical film is preferably 100 or less, more preferably 50 or less, and still more preferably 5 or less per square meter.

Since the point defects lead to a decrease in polarization degree of transmitted light or reflected light or a decrease in image sharpness, it is preferable that the number of point defects is small.

Here, the point defects include foreign matter, scratches, stains, fluctuations in film thickness, alignment failure of a liquid crystal compound, and the like.

In addition, it is preferable that the number of the above-described point defects is counted with the number of point defects having a size of preferably 100 μm or more, more preferably 30 μm or more, and still more preferably 10 μm or more.

In addition, various sensors may be incorporated in optical systems such as a virtual reality display device and an electronic finder, in which near-infrared light for eye tracking, facial expression recognition, and iris recognition is used as a light source, and in order to minimize the influence on the sensor, it is preferable that the laminated optical film according to the embodiment of the present invention is transparent to near-infrared light.

[Retardation Layer]

The retardation layer used in the laminated optical film according to the embodiment of the present invention has a function of converting emitted light into substantially linearly polarized light in a case where circularly polarized light is incident. For example, a retardation layer in which the Re is an approximately ¼ wavelength at any of the wavelengths in the visible region can be used. Here, an in-plane retardation Re (550) at a wavelength of 550 nm is preferably 120 nm to 150 nm, more preferably 125 nm to 145 nm, and still more preferably 135 nm to 140 nm.

In addition, a retardation layer in which the Re is an approximately ¾ wavelength or approximately ⅝ wavelength is also preferable from the viewpoint that the linearly polarized light can be converted into the circularly polarized light.

In addition, it is preferable that the retardation layer used in the laminated optical film according to the embodiment of the present invention has reverse dispersibility with respect to the wavelength. It is preferable that the retardation layer has reverse dispersibility from the viewpoint that circularly polarized light can be converted into linearly polarized light over a wide wavelength range in the visible region. Here, the expression "having reverse dispersibility with respect to the wavelength" denotes that as the wavelength increases, the value of the retardation at the wavelength increases.

The retardation layer having reverse dispersibility can be prepared, for example, by uniaxially stretching a polymer film such as a modified polycarbonate resin film having reverse dispersibility with reference to JP2017-049574A and the like.

In addition, the retardation layer having reverse dispersibility is not limited as long as the retardation layer substantially has reverse dispersibility, and can be prepared by laminating a retardation layer having Re of an approximately ¼ wavelength and a retardation layer having Re of an approximately ½ wavelength such that the slow axes form an angle of approximately 60° as described in, for example, JP06259925B. Here, it is known that even in a case where the ¼ wavelength retardation layer and the ½ wavelength retardation layer each have forward dispersibility (as the wavelength increases, the value of the retardation at the wavelength decreases), circularly polarized light can be converted into linearly polarized light over a wide wavelength range in the visible region, and the layers can be regarded as having substantially reverse dispersibility. In this case, it is preferable that the laminated optical film according to the embodiment of the present invention includes a reflective circular polarizer, a ¼ wavelength retardation layer, a ½ wavelength retardation layer, and a linear polarizer in this order.

In addition, it is also preferable that the retardation layer used in the laminated optical film according to the embodiment of the present invention has a layer formed by immobilizing uniformly aligned liquid crystal compounds. For example, a layer formed by uniformly aligning rod-like liquid crystal compounds horizontally to the in-plane direction or a layer formed by uniformly aligning disk-like liquid crystal compounds vertically to the in-plane direction can be used. Furthermore, for example, a retardation layer having reverse dispersibility can be prepared by uniformly aligning rod-like liquid crystal compounds having reverse dispersibility and immobilizing the compounds with reference to JP2020-084070A and the like.

In addition, it is also preferable that the retardation layer used in the laminated optical film according to the embodiment of the present invention has a layer formed by immobilizing twistedly aligned liquid crystal compounds with a helical axis in the thickness direction. For example, as described in JP05753922B and JP05960743B, it is preferable that a retardation layer having a layer formed by immobilizing twistedly aligned rod-like liquid crystal compounds or twistedly aligned disk-like liquid crystal compounds with a helical axis in the thickness direction is used from the viewpoint that the retardation layer can be regarded as having substantially reverse dispersibility.

A thickness of the retardation layer is not particularly limited, but from the viewpoint of thinning, it is preferably 0.1 to 8 µm and more preferably 0.3 to 5 µm.

The retardation layer may include a support, an alignment, or the like, but the support and the alignment layer may be a temporary support which is peeled off and removed during the production of the laminated optical film. It is preferable that a temporary support is used from the viewpoint that the thickness of the laminated optical film can be reduced by transferring the retardation layer to another laminate and peeling and removing the temporary support and the adverse effect of the retardation of the temporary support on the polarization degree of transmitted light can be eliminated.

The type of the support is not particularly limited, but it is preferable that the support is transparent to visible light, and examples thereof include films made of cellulose acylate, polycarbonate, polysulfone, polyethersulfone, polyacrylate and polymethacrylate, cyclic polyolefin, polyolefin, polyamide, polystyrene, polyester, or the like. Among these, a cellulose acylate film, cyclic polyolefin, polyacrylate, or polymethacrylate is preferable. In addition, commercially available cellulose acetate films (for example, "TD80U" or "Z-TAC" manufactured by FUJIFILM Corporation) can also be used.

In a case where the support is a temporary support, a support having high tear strength is preferable from the viewpoint of preventing breakage during peeling. For example, a polycarbonate-based film, a polyester-based film, or the like is preferable.

In addition, from the viewpoint of suppressing the adverse effect on the polarization degree of transmitted light, it is preferable that the support has a small retardation. Specifically, a magnitude of Re is preferably 10 nm or less, and an absolute value of a magnitude of Rth is preferably 50 nm or less. In addition, even in a case where the support is used as the above-described temporary support, it is preferable that the temporary support has a small retardation from the viewpoint of performing quality inspection of the retardation layer or other laminates in a step of manufacturing the laminated optical film.

In addition, it is preferable that the retardation layer used in the laminated optical film according to the embodiment of the present invention is transparent to near-infrared light in order to minimize the influence on various sensors incorporated in optical systems such as a virtual reality display device and an electronic finder, in which near-infrared light for eye tracking, facial expression recognition, and iris recognition is used as a light source.

[Linear Polarizer]

The linear polarizer used in the laminated optical film according to the embodiment of the present invention is preferably an absorption type linear polarizer. The absorption type linear polarizer absorbs linearly polarized light in an absorption axis direction among incidence rays, and transmits linearly polarized light in a transmission axis direction. A typical polarizer can be used as the linear polarizer, and preferred examples thereof include a polarizer in which a dichroic substance is dyed on polyvinyl alcohol or another polymer resin and is stretched so that the dichroic substance is aligned and a polarizer in which a dichroic substance is aligned by using alignment of a liquid crystal compound. Among these, from the viewpoint of availability and an increase in polarization degree, a polarizer obtained by dyeing polyvinyl alcohol with iodine and stretching polyvinyl alcohol is preferable.

A thickness of the linear polarizer is preferably 10 µm or less, more preferably 7 µm or less, and still more preferably 5 µm or less. In a case where the linear polarizer is thin, cracks or breakage of the film can be prevented in a case where the laminated optical film is stretched or molded.

In addition, a single plate transmittance of the linear polarizer is preferably 40% or more and more preferably 42% or more. Moreover, the polarization degree is preferably 90% or more, more preferably 95% or more, and still more preferably 99% or more. In the present invention, the single plate transmittance and the polarization degree of the linear polarizer are measured using an automatic polarizing film measuring device: VAP-7070 (manufactured by Jasco Corporation).

In addition, it is preferable that the direction of the transmission axis of the linear polarizer coincides with the direction of the polarization axis of light converted into linearly polarized light by the retardation layer. For example, in a case where the retardation layer is a layer having a retardation of a ¼ wavelength, an angle between the transmission axis of the linear polarizer and the slow axis of the retardation layer is preferably approximately 45°.

It is also preferable that the linear polarizer used in the laminated optical film according to the embodiment of the present invention is a light absorption anisotropic layer containing a liquid crystal compound and a dichroic substance. The linear polarizer containing a liquid crystal compound and a dichroic substance is preferable from the viewpoint that the thickness thereof can be reduced and cracks or breakage is unlikely to occur even in a case of being stretched or molded. A thickness of the light absorption anisotropic layer is not particularly limited, but is preferably 0.1 to 8 µm and more preferably 0.3 to 5 µm from the viewpoint of thinning.

The linear polarizer containing a liquid crystal compound and a dichroic substance can be produced with reference to, for example, JP2020-023153A. From the viewpoint of improving the polarization degree of the linear polarizer, an alignment degree of the dichroic substance in the light absorption anisotropic layer is preferably 0.95 or more and more preferably 0.97 or more.

A liquid crystal compound which does not exhibit dichroic properties in the visible region is preferable as a liquid crystal compound contained in a composition used for forming the light absorption anisotropic layer, which is used to form the light absorption anisotropic layer.

As such a liquid crystal compound, both a low-molecular-weight liquid crystal compound and a polymer liquid crystal compound can be used. Here, the "low-molecular-weight liquid crystal compound" denotes a liquid crystal compound having no repeating units in the chemical structure. In addition, the "polymer liquid crystal compound" refers to a liquid crystal compound including a repeating unit in a chemical structure.

Examples of the polymer liquid crystal compound include thermotropic liquid crystal polymers described in JP2011-237513A. In addition, it is preferable that the polymer liquid crystal compound has a crosslinkable group (such as an acryloyl group or a methacryloyl group) at a terminal.

The liquid crystal compound may be used alone or in combination of two or more kinds thereof. It is also preferable that the polymer liquid crystal compound and the low-molecular-weight liquid crystal compound are used in combination.

A content of the liquid crystal compound is preferably 25 to 2000 parts by mass, more preferably 33 to 1000 parts by mass, and still more preferably 50 to 500 parts by mass with respect to 100 parts by mass of a content of the dichroic substance in the present composition. In a case where the content of the liquid crystal compound is within the above-described range, the alignment degree of the polarizer is further improved.

The dichroic substance contained in the composition for forming the light absorption anisotropic layer, which is used to form the light absorption anisotropic layer, is not particularly limited, and examples thereof include a visible light absorbing substance (dichroic coloring agent), an ultraviolet absorbing substance, an infrared absorbing substance, a nonlinear optical substance, and a carbon nanotube. In addition, known dichroic substances (dichroic coloring agents) of the related art can be used.

In the present invention, two or more kinds of dichroic substances may be used in combination. For example, from the viewpoint of obtaining a high polarization degree over a wider wavelength range, it is preferable that at least one dichroic substance having a maximal absorption wavelength in a wavelength range of 370 to 550 nm and at least one dichroic substance having a maximal absorption wavelength in a wavelength range of 500 to 700 nm are used in combination.

In a case where the linear polarizer of the present invention includes the light absorption anisotropic layer containing the liquid crystal compound and the dichroic substance, the linear polarizer may include a support, an alignment, or the like, but the support and the alignment layer may be a temporary support which is peeled off and removed during the production of the laminated optical film. It is preferable that a temporary support is used from the viewpoint that the thickness of the laminated optical film can be reduced by transferring the light absorption anisotropic layer to another laminate and peeling and removing the temporary support and the adverse effect of the retardation of the temporary support on the polarization degree of transmitted light can be eliminated.

The type of the support is not particularly limited, but it is preferable that the support is transparent to visible light, and for example, the same support as the support used in the above-described retardation layer can be used. Preferred aspects of the support used in the linear polarizer are the same as the preferred aspects of the support used in the above-described retardation layer.

In addition, it is preferable that the linear polarizer used in the laminated optical film according to the embodiment of the present invention is transparent to near-infrared light in order to minimize the influence on various sensors incorporated in optical systems such as a virtual reality display device and an electronic finder, in which near-infrared light for eye tracking, facial expression recognition, and iris recognition is used as a light source.

[Other Functional Layers]

The laminated optical film according to the embodiment of the present invention may have other functional layers in addition to the reflective circular polarizer, the retardation layer, and the linear polarizer.

In addition, it is preferable that the other functional layers are transparent to near-infrared light in order to minimize the influence on various sensors incorporated in optical systems such as a virtual reality display device and an electronic finder, in which near-infrared light for eye tracking, facial expression recognition, and iris recognition is used as a light source.

<Positive C-Plate>

It is also preferable that the laminated optical film according to the embodiment of the present invention further includes a positive C-plate. Here, the positive C-plate is a retardation layer in which the Re is substantially zero and the Rth has a negative value. The positive C-plate can be obtained, for example, by vertically aligning rod-like liquid crystal compounds. With regard to the details of the method for manufacturing the positive C-plate, reference can be made to the description in, for example, JP2017-187732A, JP2016-053709A, JP2015-200861A, and the like.

The positive C-plate functions as an optical compensation layer for increasing the polarization degree of the transmitted light with respect to light incident obliquely. A plurality of the positive C-plates may be provided at any position of the laminated optical film.

The positive C-plate may be disposed adjacent to the reflective circular polarizer or inside the reflective circular polarizer. For example, in a case where a light reflecting layer containing a rod-like liquid crystal compound, which is formed by immobilizing a cholesteric liquid crystalline phase, is used as the reflective circular polarizer, the reflective layer has a positive Rth. Here, in a case where light is incident on the reflective circular polarizer in an oblique direction, the polarization states of the reflected light and the transmitted light may change due to the action of the Rth, and the polarization degree of the transmitted light may decrease. In a case where the positive C-plate is provided inside or in the vicinity of the reflective circular polarizer, the change in polarization state of the oblique incident light can be further suppressed, so that the decrease in polarization degree of the transmitted light can be further suppressed, and as a result, the ghost can be further suppressed, which is preferable. According to the studies conducted by the present inventors, it is preferable that the positive C-plate is disposed on a surface of the blue light reflecting layer on a side opposite to the green reflective layer, but the positive C-plate may be disposed at another place. Re of the positive C-plate in this case is preferably approximately 10 nm or less, and Rth thereof is preferably −600 to −100 nm and more preferably −400 to −200 nm.

In addition, the positive C-plate may be provided adjacent to the retardation layer or inside the retardation layer. For example, in a case where a layer formed by immobilizing a rod-like liquid crystal compound is used as the retardation layer, the retardation layer has a positive Rth. Here, in a case where light is incident on the retardation layer in an oblique direction, the polarization state of the transmitted light may change due to the action of the Rth, and the polarization degree of the transmitted light may decrease. In a case where the positive C-plate is provided inside the retardation layer and/or in the vicinity thereof, the change in polarization state of the oblique incident light is suppressed and the decrease in polarization degree of the transmitted light can be suppressed, which is preferable. According to the studies conducted by the present inventors, it is preferable that the positive C-plate is disposed on a surface of the retardation layer on a side opposite to the linear polarizer, but the positive C-plate may be disposed at another place. Re of the positive C-plate in this case is preferably approximately 10 nm or less, and Rth thereof is preferably −90 to −40 nm.

<Antireflection Layer>

It is also preferable that the laminated optical film according to the embodiment of the present invention includes an antireflection layer on a surface thereof. The laminated optical film according to the embodiment of the present invention has a function of reflecting specific circularly polarized light and transmitting circularly polarized light orthogonal to the specific circularly polarized light, and the reflection on a surface of the laminated optical film typically includes unintended reflection of polarized light, which leads to the decrease in polarization degree of the transmitted light. Therefore, it is preferable that the laminated optical film includes an antireflection layer on the surface thereof. The antireflection layer may be provided only on one surface or on both surfaces of the laminated optical film.

The type of the antireflection layer is not particularly limited, but from the viewpoint of further decreasing the reflectivity, a moth-eye film or an anti-reflective (AR) film is preferable. As the moth-eye film and the AR film, known films can be used.

In addition, in a case where the laminated optical film is stretched or molded, the moth-eye film is preferable from the viewpoint that high antireflection performance can be maintained even in a case of fluctuation in the film thickness due to the stretching. Furthermore, in a case where the antireflection layer includes a support and stretching or molding is performed, from the viewpoint of facilitating the stretching or the molding, the above-described support has a Tg peak temperature of preferably 170° C. or lower and more preferably 130° C. or lower. Specifically, for example, a PMMA film or the like is preferable.

<Second Retardation Layer>

It is also preferable that the laminated optical film according to the embodiment of the present invention further includes a second retardation layer. For example, the laminated optical film according to the embodiment of the present invention may include the reflective circular polarizer, the retardation layer, the linear polarizer, and the second retardation layer in this order.

It is preferable that the second retardation layer converts linearly polarized light into circularly polarized light, and for example, a retardation layer having Re of a ¼ wavelength is preferable. The reason for this will be described below.

Light which has been incident on the laminated optical film from the side of the reflective circular polarizer and transmitted through the reflective circular polarizer, the retardation layer, and the linear polarizer is converted into linearly polarized light, and a part of the light is reflected on the outermost surface on the side of the linear polarizer and emitted from the surface on the side of the reflective circular polarizer again. Such light is extra reflected light and may decrease the polarization degree of the reflected light, and thus it is preferable that the amount of such light is reduced. Therefore, a method of laminating an antireflection layer may be considered to suppress reflection on the outermost surface on the side of the linear polarizer, but in a case where the laminated optical film is used by being bonded to a medium such as glass or plastic, the antireflection effect cannot be obtained because reflection on the surface of the medium cannot be suppressed even in a case where the antireflection layer is provided on the bonding surface of the laminated optical film.

Meanwhile, in a case where the second retardation layer which converts linearly polarized light into circularly polarized light is provided, light which reaches the outermost surface on the side of the linear polarizer is converted into circularly polarized light, and converted into circularly polarized light orthogonal to each other in a case of reflection on the outermost surface of the medium. Thereafter, in a case where the light is transmitted through the second retardation layer again and reaches the linear polarizer, the light is converted into linearly polarized light in the absorption axis azimuth of the linear polarizer and absorbed by the linear polarizer. Therefore, it is possible to prevent extra reflection.

From the viewpoint of more effectively suppressing the extra reflection, it is preferable that the second retardation layer has substantially reverse dispersibility.

<Support>

The laminated optical film according to the embodiment of the present invention may further include a support. The support can be provided at any position, and for example, in a case where the reflective circular polarizer, the retardation layer, or the linear polarizer is a film used by being transferred from the temporary support, the support can be used as a transfer destination thereof.

The type of the support is not particularly limited, but it is preferable that the support is transparent to visible light, and examples thereof include films made of cellulose acylate, polycarbonate, polysulfone, polyethersulfone, polyacrylate and polymethacrylate, cyclic polyolefin, polyolefin, polyamide, polystyrene, polyester, or the like. Among these, a cellulose acylate film, cyclic polyolefin, polyacrylate, or polymethacrylate is preferable. In addition, commercially available cellulose acetate films (for example, "TD80U" or "Z-TAC" manufactured by FUJIFILM Corporation) can also be used.

In addition, it is preferable that the support has a small retardation from the viewpoint of suppressing the adverse effect on the polarization degree of the transmitted light and viewpoint of facilitating the optical inspection of the laminated optical film. Specifically, a magnitude of Re is preferably 10 nm or less, and an absolute value of a magnitude of Rth is preferably 50 nm or less.

In a case where the laminated optical film according to the embodiment of the present invention is stretched or molded, it is preferable that the support has a tan δ peak temperature of 170° C. or lower. From the viewpoint that the laminated optical film can be molded at a low temperature, the tan δ peak temperature is preferably 150° C. or lower and more preferably 130° C. or lower.

Here, a method of measuring tan δ will be described. E" (loss elastic modulus) and E' (storage elastic modulus) of a film sample which has been humidity-adjusted in advance in an atmosphere of a temperature of 25° C. and a relative humidity of 60% RH for 2 hours or longer are measured under the following conditions using a dynamic viscoelasticity measuring device (DVA-200, manufactured by IT Measurement & Control Co., Ltd.), and the values are used to acquire tan δ (=E"/E').

Device: DVA-200, manufactured by IT Measurement & Control Co., Ltd.
Sample: 5 mm, length of 50 mm (gap of 20 mm)
Measurement conditions: tension mode
Measurement temperature: −150° C. to 220° C.
Heating conditions: 5° C./min
Frequency: 1 Hz Typically in optical applications, a resin base material subjected to a stretching treatment is frequently used, and the tan δ peak temperature is frequently increased due to the stretching treatment. For example, with a TAC (triacetyl cellulose) base material (TG40, manufactured by FUJIFILM Corporation), the tan δ peak temperature is 180° C. or higher.

The support having a tan δ peak temperature of 170° C. or lower is not particularly limited, and various resin base materials can be used. Examples thereof include polyolefin such as polyethylene, polypropylene, and a norbornene-based polymer; a cyclic olefin-based resin; polyvinyl alcohol; polyethylene terephthalate; an acrylic resin such as polymethacrylic acid ester and polyacrylic acid ester; polyethylene naphthalate; polycarbonate; polysulfone; polyethersulfone; polyetherketone; polyphenylene sulfide, and polyphenylene oxide. Among these, from the viewpoint of being easily available from the market and having excellent transparency, a cyclic olefin-based resin, polyethylene terephthalate, or an acrylic resin is preferable, and a cyclic olefin-based resin or polymethacrylic acid ester is particularly preferable.

Examples of commercially available resin base materials include TECHNOLLOY S001G, TECHNOLLOY S014G, TECHNOLLOY 5000, TECHNOLLOY C001, and TECHNOLLOY C000 (manufactured by Sumika Acryl Co., Ltd.), LUMIRROR U type, LUMIRROR FX10, and LUMIRROR SF20 (Toray Industries, Inc.), HK-53A (Higashiyama Film Co., Ltd.), TEFLEX FT3 (TOYOBO CO., LTD.), ESCENA and SCA40 (Sekisui Chemical Co., Ltd.), ZEONOR Film (ZEON CORPORATION), and an Arton Film (JSR Corporation).

A thickness of the support is not particularly limited, and is preferably 5 to 300 μm, more preferably 5 to 100 μm, and still more preferably 5 to 30 μm.

In addition, the laminated optical film may include a layer other than the above-described layers. Examples of the layer other than the above-described layers include a pressure-sensitive adhesive layer formed from a pressure sensitive adhesive described later, an adhesive layer formed from an adhesive described later, and a refractive index adjusting layer.

In addition, a refractive index adjusting layer in which a difference in refractive index between a fast axis direction and a slow axis direction is smaller than that of the reflective circular polarizer may be provided between the reflective circular polarizer and the pressure sensitive adhesive or between the reflective circular polarizer or the adhesive. In this case, the refractive index adjusting layer preferably has a layer obtained by fixing an alignment state of cholesteric liquid crystals. By providing the refractive index adjusting layer, interfacial reflection can be further suppressed, and occurrence of the ghost can be further suppressed. In addition, it is more preferable that an average refractive index of the refractive index adjusting layer is smaller than the average refractive index of the reflective circular polarizer. In addition, a central wavelength of reflected light of the refractive index adjusting layer may be less than 430 nm or more than 670 nm, and is more preferably less than 430 nm.

[Method of Bonding Each Layer]

The laminated optical film according to the embodiment of the present invention is a laminate consisting of a plurality of layers. Each layer can be bonded by an optional adhesion method, and for example, a pressure sensitive adhesive or an adhesive can be used.

Any commercially available pressure sensitive adhesive can be used as the pressure sensitive adhesive, but from the viewpoint of thinning and viewpoint of reducing a surface roughness Ra of the laminated optical film, a thickness thereof is preferably 25 μm or less, more preferably 15 μm or less, and still more preferably 6 μm or less. In addition, a pressure sensitive adhesive which is unlikely to generate outgas is preferable as the pressure sensitive adhesive. Particularly, in a case of performing stretching or molding, a vacuum process or a heating process may be performed, and it is preferable that no outgas is generated even under such conditions.

A commercially available adhesive can be optionally used as the adhesive, and for example, an epoxy resin-based adhesive or an acrylic resin-based adhesive can be used.

From the viewpoint of thinning and viewpoint of reducing the surface roughness Ra of the laminated optical film, a thickness of the adhesive is preferably 25 μm or less, more preferably 5 μm or less, and still more preferably 1 μm or less. In addition, from the viewpoint of reducing the thickness of the adhesive layer and coating an adherend with the adhesive such that the thickness thereof is uniform, a viscosity of the adhesive is preferably 300 cP or less, more preferably 100 cP or less, and still more preferably 10 cP or less.

In addition, in a case where the adherend has surface unevenness, from the viewpoint of reducing the surface roughness Ra of the laminated optical film, an appropriate viscoelasticity or an appropriate thickness of the pressure sensitive adhesive or the adhesive can also be selected so that the surface unevenness of the layer to be bonded can be embedded. From the viewpoint of embedding the surface unevenness, it is preferable that the pressure sensitive adhesive or the adhesive has a viscosity of 50 cP or more. In addition, it is preferable that the thickness thereof is more than a height of the surface unevenness.

Examples of a method of adjusting the viscosity of the adhesive include a method of using an adhesive containing a solvent. In this case, the viscosity of the adhesive can be adjusted by a proportion of the solvent. In addition, the thickness of the adhesive can be further reduced by drying the solvent after coating the adherend with the adhesive.

In the laminated optical film, from the viewpoint of reducing the extra reflection and suppressing a decrease in polarization degrees of transmitted light and reflected light, it is preferable that the pressure sensitive adhesive or adhesive used for adhering each layer has a small difference in refractive index with adjacent layers. Specifically, the difference in refractive index with the adjacent layer is preferably 0.1 or less, more preferably 0.05 or less, and still more preferably 0.01 or less. The refractive index of the pressure sensitive adhesive or the adhesive can be adjusted, for example, by mixing fine particles of titanium oxide, fine particles of zirconia, or the like.

In addition, the reflective circular polarizer, the retardation layer, and the linear polarizer may have in-plane refractive index anisotropy, but the difference in refractive index with the adjacent layer is preferably 0.05 or less in all in-plane directions. Therefore, the pressure sensitive adhesive or the adhesive may have in-plane refractive index anisotropy.

In addition, in the adhesive layer between the layers, it is also preferable that a thickness of the adhesive layer is 100 nm or less. In a case where the thickness of the adhesive layer is 100 nm or less, light in the visible region is less likely to be affected by the difference in refractive index, and the reflection at the interface can be suppressed. The thickness of the adhesive layer is more preferably 50 nm or less. Examples of a method of forming the adhesive layer having a thickness of 100 nm or less include a method of vapor-depositing a ceramic adhesive such as silicon oxide (SiOx layer) on the bonding surface. For the bonding surface of the bonding member, before the bonding, for example, a surface reforming treatment such as a plasma treatment, a corona treatment, and a saponification treatment can be performed, and a primer layer can be applied. In addition, in a case where a plurality of bonding surfaces are present, the kind and thickness of the adhesive layer can be adjusted for each of the bonding surfaces. Specifically, for example, the adhesive layer having a thickness of 100 nm or less can be provided by the procedures (1) to (3) described below.

(1) A layer to laminate is bonded to a temporary support consisting of a glass base material.

(2) A SiOx layer having a thickness of 100 nm or less is formed on both the surface of the layer to laminate and the surface of the layer to be laminated by vapor deposition or the like; the vapor deposition can be carried out by, for example, a vapor deposition device (model number ULEYES, manufactured by ULVAC, Inc.) using SiOx powder as a vapor deposition source; in addition, it is preferable that the surface of the formed SiOx layer is subjected to a plasma treatment.

(3) After the formed SiOx layers are bonded to each other, the temporary support is peeled off; it is preferable that the bonding is carried out, for example, at a temperature of 120° C.

The application, the adhesion, or the bonding of the layers may be carried out by roll-to-roll or single-wafer. The roll-to-roll method is preferable from the viewpoint of improving the productivity and reducing axis misalignment of each layer.

Meanwhile, the single-wafer method is preferable from the viewpoints that this method is suitable for production of many kinds in small quantities and that a special adhesion method in which the thickness of the adhesive layer is 100 nm or less can be selected.

In addition, examples of the method of coating the adherend with the adhesive include known methods such as a roll coating method, a gravure printing method, a spin coating method, a wire bar coating method, an extrusion coating method, a direct gravure coating method, a reverse gravure coating method, a die coating method, a spraying method, and an ink jet method.

[Direct Application of Each Layer]

It is also preferable that no adhesive layer is provided between the layers of the laminated optical film according to the embodiment of the present invention. In a case of forming a layer, the adhesive layer can be eliminated by directly coating an adjacent layer which has already been formed. Furthermore, in a case where one or both adjacent layers are layers containing a liquid crystal compound, it is preferable that the alignment direction of the liquid crystal compound is continuously changed at the interface in order to reduce the difference in refractive index in all in-plane directions. For example, the linear polarizer containing a liquid crystal compound and a dichroic substance is directly coated a retardation layer containing a liquid crystal compound, and the liquid crystal compound of the retardation layer can be aligned can be aligned so as to be continuous at the interface by alignment regulating force of the liquid crystal compound of the linear polarizer.

[Lamination Order of Each Layer]

The laminated optical film according to the embodiment of the present invention consists of a plurality of layers, and the order of the steps of laminating the plurality of layers is not particularly limited and can be optionally selected.

For example, in a case where a functional layer is transferred from a film consisting of a temporary support and a functional layer, wrinkles or cracks during the transfer can be prevented by adjusting the laminating order such that the thickness of the film at the transfer destination reaches 10 μm or more.

In addition, from the viewpoint of reducing the surface roughness Ra of the laminated optical film, in a case where another layer is laminated on a layer having large surface unevenness, the surface unevenness may be further amplified, and thus it is preferable that the layers are laminated in order from a layer having a smaller surface roughness Ra.

In addition, from the viewpoint of quality evaluation in the step of producing the laminated optical film, the laminating order can also be selected. For example, layers excluding the reflective circular polarizer are laminated, the quality evaluation is performed using a transmission optical system, the reflective circular polarizer is laminated, and the quality evaluation is performed using a reflection optical system.

In addition, from the viewpoint of improving the production yield of the laminated optical film and reducing the cost, it is also possible to select the laminating order.

[Applications of Laminated Optical Film According to Embodiment of Present Invention]

For example, as disclosed in JP2017-227720A and JP1995-120679A (JP-H7-120679A), the laminated optical film according to the embodiment of the present invention can be used as a reflective polarizer to be incorporated in an in-vehicle room mirror, a virtual reality display device, an electronic finder, and the like. Particularly, in the virtual reality display device, the electronic finder, or the like, which has a reciprocating optical system allowing light to be reflected between the reflective polarizer and the half mirror to reciprocate the light, the laminated optical film according to the embodiment of the present invention is extremely useful from the viewpoint of improving clearness of a display image. In addition, since a virtual reality display device, an electronic finder, or the like, which has a reciprocating optical system, includes an optical film such as an absorption type polarizer or a circular polarizer in addition to the reflective polarizer in some cases, clearness of the display image can be further improved by applying some of the members, the bonding methods, and the like used for the laminated optical film according to the embodiment of the present invention to the optical film other than the reflective polarizer described above.

EXAMPLES

Hereinafter, the features of the present invention will be described in more detail with reference to Examples. The materials, the used amounts, the ratios, the treatment contents, the treatment procedures, and the like described in Examples can be appropriately changed without departing from the gist of the present invention. In addition, configurations other than the configurations described below can be employed without departing from the gist of the present invention.

[Preparation of Coating Liquid for Reflective Layer]

<Coating Liquid R-1 for Reflective Layer>

A composition shown below was stirred and dissolved in a container held at 70° C. to prepare a coating liquid R-1 for a reflective layer. Here, R represents a coating liquid containing a rod-like liquid crystal compound.

| Coating liquid R-1 for reflective layer | |
|---|---|
| Methyl ethyl ketone | 120.9 parts by mass |
| Cyclohexanone | 21.3 parts by mass |
| Mixture of rod-like liquid crystal compounds shown below | 100.0 parts by mass |
| Photopolymerization initiator b | 1.00 parts by mass |
| Chiral agent A shown below | 3.00 parts by mass |
| Surfactant F1 shown below | 0.027 parts by mass |
| Surfactant F2 shown below | 0.067 parts by mass |

Mixture of Rod-Like Liquid Crystal Compounds

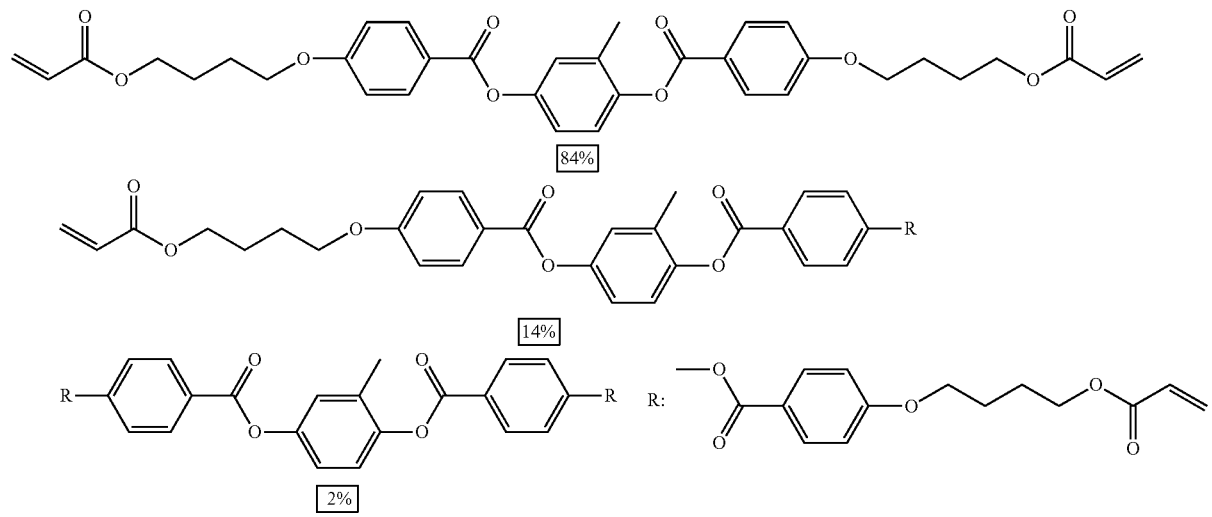

In the above-described mixture, each numerical value denotes the content in units of % by mass. In addition, R is a group bonded through an oxygen atom. Furthermore, an average molar absorption coefficient of the above-described rod-like liquid crystal at a wavelength of 300 to 400 nm was 140/mol·cm.

Chiral agent A

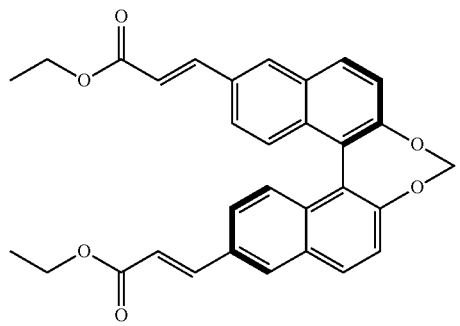

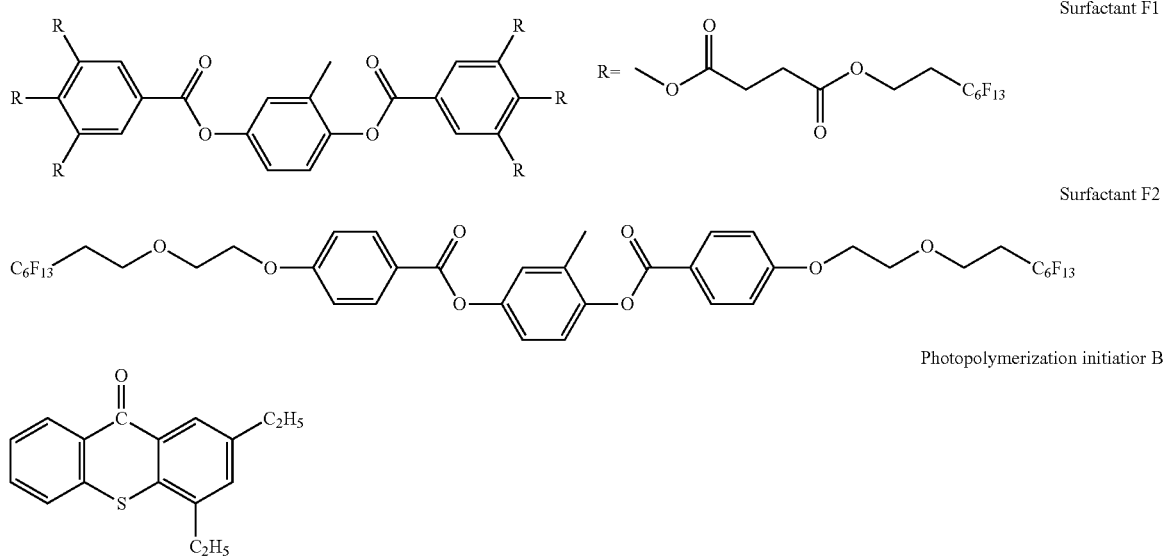

The chiral agent A is a chiral agent in which helical twisting power (HTP) is reduced by light.

<Coating Liquids R-2 to R-6 and R-11 to R-17 for Reflective Layer>

Coating liquids were prepared in the same manner as in the coating liquid R-1 for a reflective layer, except that the amount of the chiral agent A added was changed as shown in Table 1 below.

<Coating Liquid R-7 for Reflective Layer>

A coating liquid was prepared in the same manner as in the coating liquid R-1 for a reflective layer, except that the chiral agent A was changed to a chiral agent B synthesized by the following synthesis method. Hereinafter, a method for synthesizing the chiral agent B will be described.

(Synthesis of Intermediate 1)

55.0 g of (S)-binaphthol (manufactured by Tokyo Chemical Industry Co., Ltd.) and 485 g of butyl acetate (manufactured by Wako Pure Chemical Corporation) were placed and dissolved in a 1 L three-necked flask, and the solution was cooled with ice water. 82.9 g of bromine (manufactured by Wako Pure Chemical Corporation) was added dropwise thereto at 0° C. to 10° C., and the mixture was further stirred at 0° C. to 10° C. for 3 hours. Subsequently, sodium hydrogen sulfite water (18.28 g of sodium hydrogen sulfite (manufactured by Wako Pure Chemical Corporation) and 275 mL of water) was added to the obtained reaction solution while maintaining the temperature at 10° C. or lower, the temperature was raised to room temperature, and the aqueous layer was removed. The organic layer was washed with 275 mL of water and sodium hydrogen carbonate water (11.0 g of sodium hydrogen carbonate (manufactured by Wako Pure Chemical Corporation) and 275 mL of water) in this order. The washed solution was dried over magnesium sulfate, the solvent was evaporated from the solution under reduced pressure to adjust the liquid amount to 160 g, and the residue was transferred to a three-neck flask.

Subsequently, 66.2 g of DMF (N,N-dimethylformamide, manufactured by Wako Pure Chemical Corporation), 79.7 g of potassium carbonate (manufactured by NIPPON SODA CO., LTD.), and 43.4 g of dibromomethane (manufactured by Wako Pure Chemical Corporation) were added to the above-described three-neck flask, the temperature was raised to 90° C., and the mixture was stirred at 90° C. to 95° C. for 8 hours. Thereafter, the reaction solution was cooled to room temperature, and then the solid was separated by filtration while being washed with 170 mL of ethyl acetate (manufactured by Wako Pure Chemical Corporation). The solution after the solid was separated by filtration was concentrated under reduced pressure to adjust the liquid amount to 215 g, and 550 mL of methanol (manufactured by Wako Pure Chemical Corporation) was added thereto at 45° C. to 50° C. to precipitate crystals. The solution was cooled to 0° C. to 5° C., and crystals were collected by filtration and washed with 220 mL of methanol. The obtained crude crystals were suspended in 550 mL of methanol and stirred at 0° C. to 5° C. for 30 minutes, and the crystals were collected by filtration under reduced pressure and washed with 220 mL of methanol. The obtained crystals were dried under reduced pressure at 55° C. for 24 hours, thereby obtaining an intermediate 1 (63.1 g, yield: 72%).

(Synthesis of Intermediate 2)

13.8 g of the intermediate 1, 46.8 g of butyl acrylate (manufactured by Wako Pure Chemical Corporation), 42.2 g of potassium carbonate (manufactured by NIPPON SODA CO., LTD.), 39.2 g of tetrabutylammonium bromide (manufactured by Wako Pure Chemical Corporation), 0.19 g of 2,2,6,6-tetramethylpiperidine 1-oxy free radical (TEMPO, manufactured by Wako Pure Chemical Corporation), and 47.0 g of DMF (N,N-dimethylformamide, manufactured by Wako Pure Chemical Corporation) were charged into a 1 L three-neck flask, and the mixture was degassed by bubbling with nitrogen for 2 hours. Thereafter, 12.3 g of triethylamine (manufactured by Wako Pure Chemical Corporation), 0.41 g of palladium acetate (manufactured by Wako Pure Chemical Corporation), and 11 g of DMF were added thereto, and the mixture was stirred at room temperature for 1 hour while flowing nitrogen, and then further stirred at an internal temperature of 80° C. to 85° C. for 1 hour. A solution obtained by dissolving 41.8 g of the intermediate 1, which had been subjected to bubbling with nitrogen for 2 hours, in 127.0 g of DMF was added dropwise to the reaction solution while maintaining an internal temperature of 80° C. to 85° C., and the mixture was further stirred at 90° C. to 95° C. for 1 hour. After completion of the reaction, the mixture was cooled to room temperature, 420 mL of toluene (manufactured by Wako Pure Chemical Corporation) was added thereto, and the mixture was filtered through Celite to remove solid, and further washed with 305 mL of toluene. The solution after the solid was separated by filtration was washed twice with a mixed solution of 77.8 g of sodium chloride, 11.84 g of concentrated hydrochloric acid, and 440 mL of water, and then a mixed solution of 103 g of sodium chloride and 415 mL of water. The washed solution was dried over magnesium sulfate, 110 g of silica gel (Wakogel C200, manufactured by Wako Pure Chemical Corporation) was added thereto, and the mixture was stirred for 1 hour and filtered through Celite while washing with 490 mL of toluene, thereby removing solids. After the solid was separated by filtration, 0.19 g of TEMPO was added to the solution, and the solvent was distilled off under reduced pressure. After adjusting the liquid amount to 100 mL, the liquid was transferred to a three-neck flask, 40 mL of toluene was added thereto, and the mixture was heated to 60° C. 355 mL of methanol (manufactured by Wako Pure Chemical Corporation) was added dropwise to the solution at 50° C. to 60° C., and then the temperature was decreased to 45° C. to precipitate crystals. The solution was cooled to 0° C. to 5° C. over 2 hours, and crystals were collected by filtration and sequentially washed with a mixed solvent of 72 mL of toluene and 290 mL of methanol, and then 360 mL of methanol. The obtained crystals were blast-dried at 40° C. for 24 hours, thereby obtaining an intermediate 2 (47.6 g, yield: 71%).

(Synthesis of Chiral Agent B)

45 g of the intermediate 2 was dissolved in 900 mL of ethyl acetate in a 2 L three-neck flask. At room temperature, 27.8 g of a 20% sodium ethylate ethanol solution (manufactured by NIPPON SODA CO., LTD.) was added dropwise to the solution, and then the mixture was stirred at 20° C. to 25° C. for 2 hours. A mixed solution of 41.4 g of sodium chloride, 8.97 g of concentrated hydrochloric acid, and 240 mL of water was prepared in another 2 L three-neck flask, cooled to 15° C. or lower, and the previous reaction solution was added thereto while maintaining an internal temperature of 30° C. or lower. Furthermore, 45 mL of ethyl acetate was added thereto, the mixture was stirred and then allowed to stand, and the aqueous layer was removed. The obtained organic layer was washed twice with a mixed solution of 54 g of sodium chloride and 215 mL of water, a mixed solution of 5.1 g of sodium hydrogen carbonate, 41 g of sodium chloride, and 230 mL of water, and then a mixed solution of 54 g of sodium chloride and 215 mL of water. The washed solution was dried over magnesium sulfate, the solvent was evaporated from the solution under reduced pressure to adjust the liquid amount to 140 g, and the residue was transferred to a three-neck flask and heated to 65° C. 210 mL of methanol (manufactured by Wako Pure Chemical Corporation) was added dropwise thereto at 60° C. to 45° C. to precipitate crystals, the solution was further cooled to 0° C. to 5° C., and the crystals were collected by filtration and then washed with a mixed solvent of 30 mL of ethyl acetate and 90 mL of methanol. The obtained crystals were blast-dried at 40° C. for 24 hours, thereby obtaining the chiral agent B (34.4 g, yield: 85%, HPLC purity: 96.9%).

$^1$H NMR of chiral agent B (deuterated solvent: $CDCl_3$): δ 8.02 (4H, d), 7.84 (2H, d), 7.50 (6H, m), 6.52 (2H, d), 5.71 (2H, s), 4.28 (4H, m), 1.35 (6H, t)

The reaction scheme of the method for synthesizing the chiral agent B is shown below.

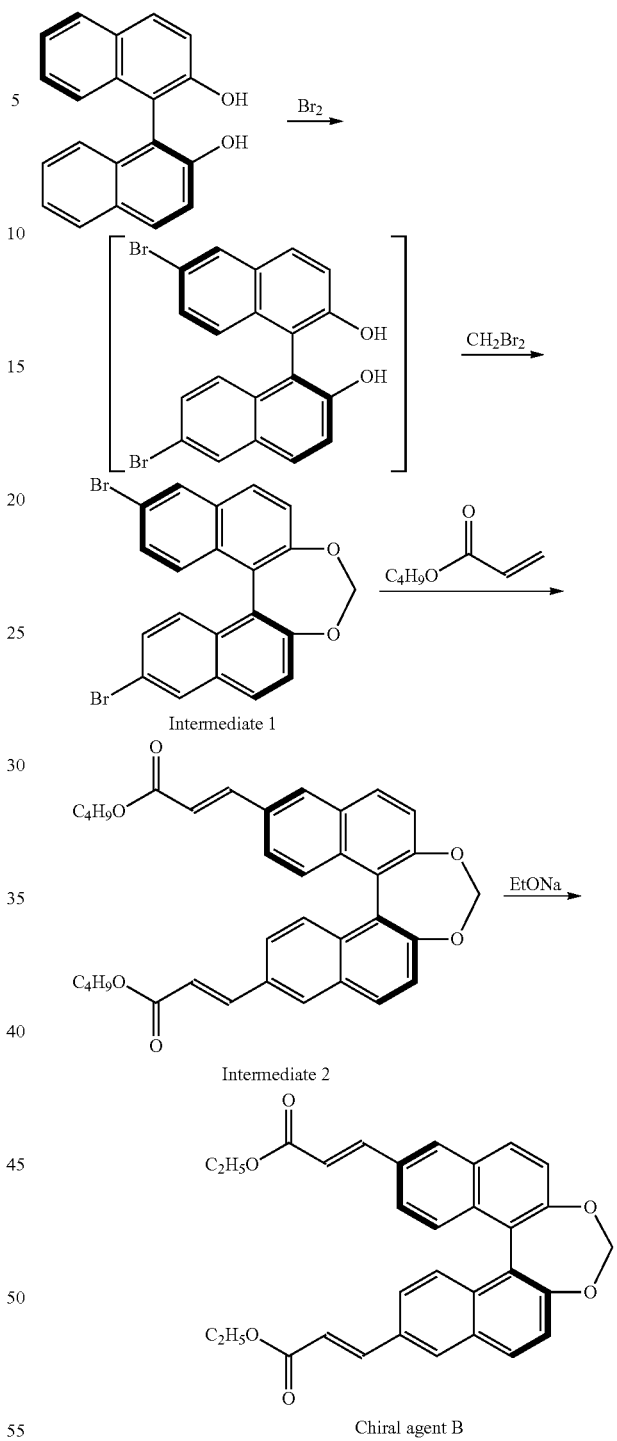

In addition, the chiral agent B could also be synthesized by the following synthesis method.

[Another Method for Synthesizing Chiral Agent B]

The reactions, the liquid separation, and the adsorbent treatment were carried out in the same manner as in the method of synthesizing the intermediate 2 using the intermediate 1, except that the butyl acrylate in the method of synthesizing the intermediate 2 in Synthesis Example 1 was changed to ethyl acrylate, and then the chiral agent B was directly synthesized by precipitating a solid using ethyl acetate and methanol, and collecting the solid by filtration. It was confirmed that the chiral agent B could be synthesized by the above-described method (yield: 61%, HPLC purity: 99.0%).

Table 1. Amount of chiral agent of coating liquid containing rod-like liquid crystal compound

TABLE 1

| Coating liquid name | Type of chiral agent | Amount of chiral agent (part by mass) |
|---|---|---|
| Liquid R-1 | Chiral agent A | 3.00 |
| Liquid R-2 | Chiral agent A | 3.62 |
| Liquid R-3 | Chiral agent A | 3.55 |
| Liquid R-4 | Chiral agent A | 3.30 |
| Liquid R-5 | Chiral agent A | 4.40 |
| Liquid R-6 | Chiral agent A | 3.45 |
| Liquid R-7 | Chiral agent B | 3.00 |
| Liquid R-11 | Chiral agent A | 3.77 |
| Liquid R-12 | Chiral agent A | 3.30 |
| Liquid R-13 | Chiral agent A | 2.87 |
| Liquid R-14 | Chiral agent A | 4.50 |
| Liquid R-15 | Chiral agent A | 3.70 |

TABLE 1-continued

| Coating liquid name | Type of chiral agent | Amount of chiral agent (part by mass) |
|---|---|---|
| Liquid R-16 | Chiral agent A | 3.24 |
| Liquid R-17 | Chiral agent A | 2.87 |

<Coating Liquid D-1 for Reflective Layer>

A composition shown below was stirred and dissolved in a container held at 50° C. to prepare a coating liquid D-1 for a reflective layer. Here, D represents a coating liquid containing a disk-like liquid crystal.

| Coating liquid D-1 for reflective layer | |
|---|---|
| Disk-like liquid crystal compound (A) shown below | 80 parts by mass |
| Disk-like liquid crystal compound (B) shown below | 20 parts by mass |
| Polymerizable monomer E1 | 10 parts by mass |
| Surfactant F4 | 0.3 parts by mass |
| Photopolymerization initiator (IRGACURE 907 manufactured by BASF SE) | 3 parts by mass |
| Chiral agent A described above | 4.00 parts by mass |
| Methyl ethyl ketone | 290 parts by mass |
| Cyclohexanone | 50 parts by mass |

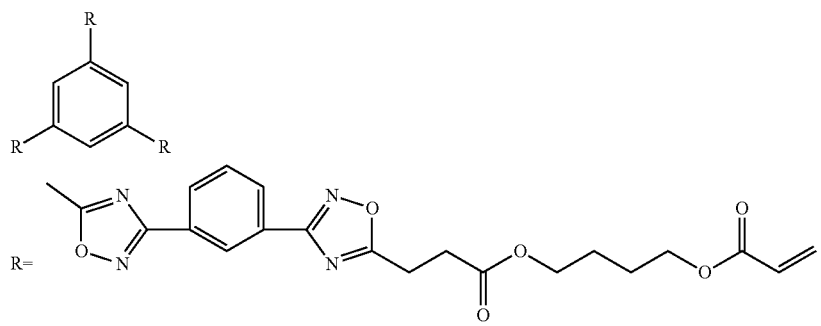

Disk-like liquid crystal compound (A)

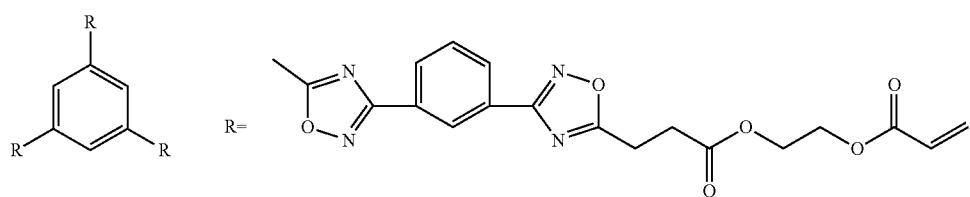

Disk-like liquid crystal compound (B)

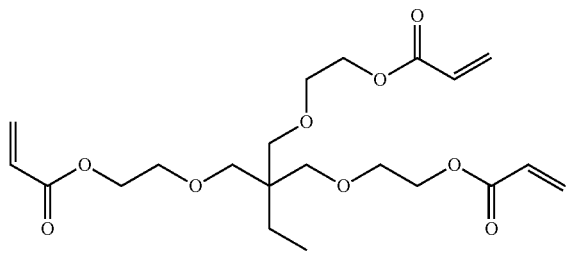

Polymerizable monomoer E1

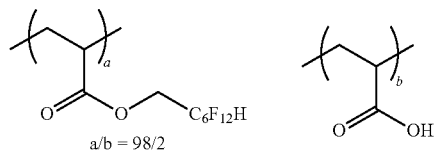

Surfactant F4

<Coating Liquids D-2 to D-5 and D-11 to D16 for Reflective Layer>

Coating liquids were prepared in the same manner as in the coating liquid D-1 for a reflective layer, except that the amount of the chiral agent A added was changed as shown in Table 2 below.

Table 2. Amount of chiral agent of coating liquid containing disk-like liquid crystal compound

TABLE 2

| Coating liquid name | Amount of chiral agent (part by mass) |
|---|---|
| Liquid D-1 | 4.00 |
| Liquid D-2 | 5.30 |
| Liquid D-3 | 3.80 |
| Liquid D-4 | 4.38 |
| Liquid D-5 | 3.65 |
| Liquid D-11 | 5.42 |
| Liquid D-12 | 4.38 |
| Liquid D-13 | 3.80 |
| Liquid D-14 | 4.56 |
| Liquid D-15 | 4.00 |
| Liquid D-16 | 3.67 |

[Production of Reflective Circular Polarizer 1]

A polyethylene terephthalate (PET) film (A4100 manufactured by Toyobo Co., Ltd.) having a thickness of 50 μm was prepared as a temporary support. The PET film had an easy adhesion layer on one surface.

A surface of the PET film, which was not provided with the easy adhesion layer, was subjected to a rubbing treatment, coated with the coating liquid R-1 for a reflective layer prepared above using a wire bar coater, and dried at 110° C. for 120 seconds. Thereafter, the surface was irradiated with light using a metal halide lamp at 100° C., an illuminance of 80 mW/cm$^2$, and an irradiation amount of 500 mJ/cm$^2$ in a low oxygen atmosphere (100 ppm or less), thereby curing the coating liquid to form a red light reflecting layer (first light reflecting layer) consisting of a cholesteric liquid crystal layer. The irradiation with light was performed from the side of the cholesteric liquid crystal layer in all cases. Here, the coating thickness was adjusted so that the film thickness of the cured red light reflecting layer was 4.5 μm.

Next, the surface of the red light reflecting layer was subjected to a corona treatment at a discharge amount of 150 W·min/m$^2$, and the surface subjected to the corona treatment was coated with the coating liquid D-1 for a reflective layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was kept at 45° C. and irradiated with ultraviolet rays (300 mJ/cm$^2$) using a metal halide lamp in a nitrogen atmosphere, thereby curing the coating film to form a yellow light reflecting layer (second light reflecting layer) on the red light reflecting layer. The irradiation with light was performed from the side of the cholesteric liquid crystal layer in all cases. Here, the coating thickness was adjusted so that the film thickness of the cured yellow light reflecting layer was 3.3 μm.

Next, the yellow light reflecting layer was coated with the coating liquid R-2 for a reflective layer using a wire bar coater and dried at 110° C. for 120 seconds. Thereafter, the surface was irradiated with light using a metal halide lamp at 100° C., an illuminance of 80 mW/cm$^2$, and an irradiation amount of 500 mJ/cm$^2$ in a low oxygen atmosphere (100 ppm or less), thereby curing the coating liquid to form a green light reflecting layer (third light reflecting layer) on the yellow light reflecting layer. The irradiation with light was performed from the side of the cholesteric liquid crystal layer in all cases. Here, the coating thickness was adjusted so that the film thickness of the cured green light reflecting layer was 2.7 μm.

Next, the surface of the green light reflecting layer was subjected to a corona treatment at a discharge amount of 150 W·min/m$^2$, and the surface subjected to the corona treatment was coated with the coating liquid D-2 for a reflective layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was kept at 45° C. and irradiated with ultraviolet rays (300 mJ/cm$^2$) using a metal halide lamp in a nitrogen atmosphere, thereby curing the coating film to form a blue light reflecting layer (fourth light reflecting layer) on the green light reflecting layer. The irradiation with light was performed from the side of the cholesteric liquid crystal layer in all cases. Here, the coating thickness was adjusted so that the film thickness of the cured blue light reflecting layer was 2.5 μm.

[Production of Reflective Circular Polarizers 2 to 7 and 10 to 13]

Reflective circular polarizers 2 to 7 and 10 were produced by the same production method as that for the reflective circular polarizer 1, except that the coating liquid for a reflective layer and the film thickness were changed as described in the tables below. In addition, reflective circular polarizers 11 to 13 were produced by the same production method as that for the reflective circular polarizer 1, except that the number of layers was increased to 6, 8, and 16, and the coating liquid for a reflective layer and the film thickness were changed as described in the tables below.

Table 3-1. Coating liquids used to produce reflective circular polarizers 1 to 10

Table 3-2. Coating liquids used to produce reflective circular polarizer 11

Table 3-3. Coating liquids used to produce reflective circular polarizer 12

Table 3-4. Coating liquids used to produce reflective circular polarizer 13

In the following tables, the coating liquid R-1 for a reflective layer is abbreviated as "liquid R-1".

TABLE 3

| Level | Type of coating liquid | | | | Reflection center wavelength (nm) | | | |
|---|---|---|---|---|---|---|---|---|
| | First layer | Second layer | Third layer | Fourth layer | First layer | Second layer | Third layer | Fourth layer |
| Reflective circular polarizer 1 | Liquid R-1 | Liquid D-1 | Liquid R-2 | Liquid D-2 | 655 | 600 | 550 | 460 |
| Reflective circular polarizer 2 | Liquid D-3 | Liquid R-3 | Liquid D-2 | — | 630 | 560 | 460 | — |

TABLE 3-continued

| | Type of coating liquid | | | | Reflection center wavelength (nm) | | | |
|---|---|---|---|---|---|---|---|---|
| Level | First layer | Second layer | Third layer | Fourth layer | First layer | Second layer | Third layer | Fourth layer |
| Reflective circular polarizer 3 | Liquid R-1 | Liquid R-4 | Liquid D-4 | Liquid D-2 | 655 | 600 | 550 | 460 |
| Reflective circular polarizer 4 | Liquid R-5 | Liquid D-4 | Liquid R-4 | Liquid D-5 | 460 | 550 | 600 | 655 |
| Reflective circular polarizer 5 | Liquid R-1 | Liquid D-1 | Liquid D-4 | Liquid R-5 | 655 | 600 | 550 | 460 |
| Reflective circular polarizer 6 | Liquid D-5 | Liquid R-4 | Liquid D-4 | Liquid R-5 | 655 | 600 | 550 | 460 |
| Reflective circular polarizer 7 | Liquid R-1 | Liquid D-4 | Liquid R-4 | Liquid D-2 | 655 | 550 | 600 | 460 |
| Reflective circular polarizer 8 | Liquid R-1 | Liquid D-1 | Liquid R-2 | Liquid D-2 | 655 | 600 | 550 | 460 |
| Reflective circular polarizer 9 | Liquid D-5 | Liquid R-6 | Liquid D-2 | — | 655 | 575 | 460 | — |
| Reflective circular polarizer 10 | Liquid R-7 | Liquid D-1 | Liquid R-2 | Liquid D-2 | 655 | 600 | 550 | 460 |

TABLE 4

| | Type of coating liquid | Reflection center wavelength (nm) |
|---|---|---|
| Sixth layer | Liquid D-11 | 450 |
| Fifth layer | Liquid R-11 | 530 |
| Fourth layer | Liquid D-12 | 550 |
| Third layer | Liquid R-12 | 600 |
| Second layer | Liquid D-13 | 630 |
| First layer | Liquid R-13 | 680 |

TABLE 5

| | Type of coating liquid | Reflection center wavelength (nm) |
|---|---|---|
| Eighth layer | Liquid D-11 | 450 |
| Seventh layer | Liquid R-14 | 450 |
| Sixth layer | Liquid D-14 | 530 |
| Fifth layer | Liquid R-15 | 540 |
| Fourth layer | Liquid D-15 | 600 |
| Third layer | Liquid R-16 | 610 |
| Second layer | Liquid D-16 | 650 |
| First layer | Liquid R-17 | 680 |

TABLE 6

| | Type of coating liquid | Reflection center wavelength (nm) |
|---|---|---|
| Sixteenth layer | Liquid D-11 | 450 |
| Fifteenth layer | Liquid R-14 | 450 |
| Fourteenth layer | Liquid D-11 | 450 |
| Thirteenth layer | Liquid R-14 | 450 |
| Twelfth layer | Liquid D-14 | 530 |
| Eleventh layer | Liquid R-15 | 540 |
| Tenth layer | Liquid D-14 | 530 |
| Ninth layer | Liquid R-15 | 540 |
| Eighth layer | Liquid D-15 | 600 |
| Seventh layer | Liquid R-16 | 610 |
| Sixth layer | Liquid D-15 | 600 |
| Fifth layer | Liquid R-16 | 610 |
| Fourth layer | Liquid D-16 | 650 |
| Third layer | Liquid R-17 | 680 |
| Second layer | Liquid D-16 | 650 |
| First layer | Liquid R-17 | 680 |

[Production of Reflective Circular Polarizer 8]

A reflective circular polarizer 8 was produced by transferring a light reflecting layer of a film 2 onto a light reflecting layer of a film 1 in two films of the film 1 and the film 2 formed by laminating and coating two light reflecting layers on a temporary support. In the film 1, a first light reflecting layer and a second light reflecting layer were formed in this order on the temporary support. In addition, in the film 2, a third light reflecting layer and a fourth light reflecting layer were formed in this order on the temporary support. The transfer of the light reflecting layer was carried out by the following procedure.

(1) First, the light reflecting layer of the film 2 was transferred to a laminate film; the transfer to the laminate film was performed by bonding the laminate film with a pressure sensitive adhesive to the surface of the film 2 opposite to the temporary support, and then peeling off the temporary support.

(2) A UV adhesive Chemi-seal U2084B (manufactured by ChemiTech Inc., refractive index n after curing: 1.60) was applied onto a surface of the film 1 opposite to the temporary support using a wire bar coater such that the thickness was set to 2 μm; the laminate film was laminated thereon with a laminator so that the light reflecting layer transferred thereto was in contact with the laminate film.

(3) After nitrogen purging until the oxygen concentration reached 100 ppm or less in a purge box, the film 1 was cured by being irradiated with ultraviolet rays using a high-pressure mercury lamp from the temporary support side; the illuminance was 25 mW/cm$^2$ and the irradiation amount was 1000 mJ/cm$^2$; in this manner, the reflective circular polarizer 8 in which the first light reflecting layer to the fourth light reflecting layer were formed was obtained.

[Production of Reflective Circular Polarizer 9]

A reflective circular polarizer 9 was formed such that a helical pitch of the second light reflecting layer changed continuously in a thickness direction. A pitch gradient layer having a gradient was formed. The first light reflecting layer and the third light reflecting layer were produced by the same production method as those of the reflective circular polarizer 1. The pitch gradient layer was formed according to the following procedure.

The first light reflecting layer was formed on a rubbed PET film, and then the coating liquid R-6 for a reflective layer was applied thereto using a wire bar coater. Subsequently, the coating film was heat-aged at 105° C. for 2 minutes to obtain a uniform alignment state. Thereafter, the coating film was kept at 75° C. and irradiated with ultraviolet rays (30 mJ/cm$^2$) using a metal halide lamp in a nitrogen atmosphere (100 ppm or less). During the ultraviolet irradiation, a band pass filter which transmitted only light having a wavelength of 300 nm to 350 nm was set between the metal halide lamp and the sample. The amount of ultraviolet irradiation was measured through the band pass filter. Subsequently, the coating film was kept at 75° C. and heat-aged for 10 seconds. Subsequently, the coating film was kept at 75° C. and irradiated with light using a metal halide lamp at an illuminance of 25 mW/cm$^2$ and an irradiation amount of 500 mJ/cm$^2$ in a low oxygen atmosphere (100 ppm or less), thereby curing the coating liquid to form the second light reflecting layer consisting of a cholesteric liquid crystal layer. The irradiation with light was performed from the side of the cholesteric liquid crystal layer. Here, the coating thickness was adjusted so that the film thickness of the cured second light reflecting layer was 7.0 μm.

Characteristics of the produced reflective circular polarizers 1 to 10 are described in Table 4-1. In addition, characteristics of the produced reflective circular polarizers 11 to 13 are described in Tables 4-2, 4-3, and 4-4. A reflection center wavelength (central wavelength of reflected light) was confirmed by producing a film obtained by applying only a single layer. Here, the reflection center wavelength was used to define characteristics of a light reflection film having a reflection band formed of a cholesteric liquid crystal, and referred to the middle point of a spectral band reflected by the film. Specifically, the reflection center wavelength was obtained by calculating the average value of the wavelengths on the short wavelength side and the wavelengths on the long wavelength side which show the half value of the peak reflectivity by the method described above. In addition, absolute values of SRth$_i$ of the light reflecting layers of the reflective circular polarizer 1 and the reflective circular polarizers 4 to 11 were all 0.25 μm or less. Absolute values of SRth$_i$ of the light reflecting layers of the reflective circular polarizers 12 and 13 were all 0.20 μm or less. The value of Rth was measured using AxoScan OPMF-1 (manufactured by Opto Science, Inc.).

Table 4-1. Produced reflective circular polarizers 1 to 10 (coating liquid and film thickness)

Table 4-2. Produced reflective circular polarizer 11 (coating liquid and film thickness)

Table 4-3. Produced reflective circular polarizer 12 (coating liquid and film thickness)

Table 4-4. Produced reflective circular polarizer 13 (coating liquid and film thickness)

TABLE 7

| Level | Type of coating liquid | | | | Film thickness (μm) | | | | Lamination method |
|---|---|---|---|---|---|---|---|---|---|
| | First layer | Second layer | Third layer | Fourth layer | First layer | Second layer | Third layer | Fourth layer | |
| Reflective circular polarizer 1 | Liquid R-1 | Liquid D-1 | Liquid R-2 | Liquid D-2 | 4.5 | 3.3 | 2.7 | 2.5 | Laminating and coating |
| Reflective circular polarizer 2 | Liquid D-3 | Liquid R-3 | Liquid D-2 | — | 4.5 | 3.3 | 2.5 | — | Laminating and coating |
| Reflective circular polarizer 3 | Liquid R-1 | Liquid R-4 | Liquid D-4 | Liquid D-2 | 4.5 | 3.3 | 2.7 | 2.5 | Laminating and coating |
| Reflective circular polarizer 4 | Liquid R-5 | Liquid D-4 | Liquid R-4 | Liquid D-5 | 2.5 | 2.7 | 3.3 | 4.5 | Laminating and coating |
| Reflective circular polarizer 5 | Liquid R-1 | Liquid D-1 | Liquid D-4 | Liquid R-5 | 4.5 | 3.3 | 2.7 | 2.5 | Laminating and coating |
| Reflective circular polarizer 6 | Liquid D-5 | Liquid R-4 | Liquid D-4 | Liquid R-5 | 4.5 | 3.3 | 2.7 | 2.5 | Laminating and coating |
| Reflective circular polarizer 7 | Liquid R-1 | Liquid D-4 | Liquid R-4 | Liquid D-2 | 4.5 | 2.7 | 3.3 | 2.5 | Laminating and coating |
| Reflective circular polarizer 8 | Liquid R-1 | Liquid D-1 | Liquid R-2 | Liquid D-2 | 4.5 | 3.3 | 2.7 | 2.5 | UV adhesion |
| Reflective circular polarizer 9 | Liquid D-5 | Liquid R-6 | Liquid D-2 | — | 4.5 | 7 | 2.5 | — | Laminating and coating |
| Reflective circular polarizer 10 | Liquid R-7 | Liquid D-1 | Liquid R-2 | Liquid D-2 | 4.5 | 3.3 | 2.7 | 2.5 | Laminating and coating |

TABLE 8

| | Type of coating liquid | Film thickness (μm) |
|---|---|---|
| Sixth layer | Liquid D-11 | 2.3 |
| Fifth layer | Liquid R-11 | 1.7 |
| Fourth layer | Liquid D-12 | 1.8 |
| Third layer | Liquid R-12 | 1.9 |
| Second layer | Liquid D-13 | 2.4 |
| First layer | Liquid R-13 | 0.9 |

TABLE 9

| | Type of coating liquid | Film thickness (um) |
|---|---|---|
| Eighth layer | Liquid D-11 | 1.3 |
| Seventh layer | Liquid R-14 | 1.6 |
| Sixth layer | Liquid D-14 | 1.5 |
| Fifth layer | Liquid R-15 | 0.9 |
| Fourth layer | Liquid D-15 | 1.9 |
| Third layer | Liquid R-16 | 1.0 |

TABLE 9-continued

| | Type of coating liquid | Film thickness (μm) |
|---|---|---|
| Second layer | Liquid D-16 | 2.3 |
| First layer | Liquid R-17 | 1.5 |

TABLE 10

| | Type of coating liquid | Film thickness (μm) |
|---|---|---|
| Sixteenth layer | Liquid D-11 | 1.2 |
| Fifteenth layer | Liquid R-14 | 0.7 |
| Fourteenth layer | Liquid D-11 | 0.4 |
| Thirteenth layer | Liquid R-14 | 0.7 |
| Twelfth layer | Liquid D-14 | 0.9 |
| Eleventh layer | Liquid R-15 | 0.5 |
| Tenth layer | Liquid D-14 | 0.7 |
| Ninth layer | Liquid R-15 | 0.5 |
| Eighth layer | Liquid D-15 | 1.0 |
| Seventh layer | Liquid R-16 | 0.6 |
| Sixth layer | Liquid D-15 | 0.8 |
| Fifth layer | Liquid R-16 | 0.6 |
| Fourth layer | Liquid D-16 | 1.0 |
| Third layer | Liquid R-17 | 0.6 |
| Second layer | Liquid D-16 | 1.2 |
| First layer | Liquid R-17 | 0.9 |

[Production of Laminated Optical Film]

A laminated optical film was produced by the following procedure.

<Production of Positive C-Plate 1>

A positive C-plate 1 was produced by adjusting the film thickness with reference to the method described in paragraphs 0132 to 0134 of JP2016-053709A. Re of the positive C-plate 1 was 0.2 nm and Rth thereof was −310 nm.

<Production of Retardation Layer 1>

A retardation layer 1 having reverse dispersibility was produced with reference to the method described in paragraphs 0151 to 0163 of JP2020-084070A. Re of the retardation layer 1 was 146 nm and Rth thereof was 73 nm.

<Production of Positive C-Plate 2>

A positive C-plate 2 was produced in the same manner as in the positive C-plate 1, except that the film thickness was adjusted. Re of the positive C-plate 2 was 0.1 nm and Rth thereof was −70 nm.

<Production of Linear Polarizer>

A linear polarizer was produced through the following procedure.

(Production of Cellulose Acylate Film 1)

—Production of Core Layer Cellulose Acylate Dope—

The following composition was put into a mixing tank and stirred to dissolve each component, thereby preparing a cellulose acetate solution used as a core layer cellulose acylate dope.

| Core layer cellulose acylate dope | |
|---|---|
| Cellulose acetate having acetyl substitution degree of 2.88 | 100 parts by mass |
| Polyester compound B described in Examples of JP2015-227955A | 12 parts by mass |
| Compound F shown below | 2 parts by mass |
| Methylene chloride (first solvent) | 430 parts by mass |
| Methanol (second solvent) | 64 parts by mass |

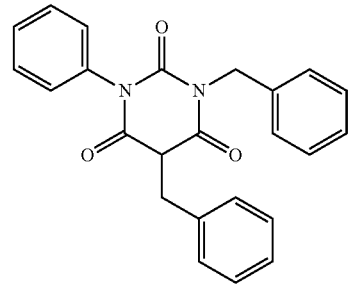

Compound F

—Production of Outer Layer Cellulose Acylate Dope—

10 parts by mass of the following matte agent solution was added to 90 parts by mass of the core layer cellulose acylate dope to prepare a cellulose acetate solution to be used as an outer layer cellulose acylate dope.

| Matting agent solution | |
|---|---|
| Silica particles with average particle size of 20 nm (AEROSIL R972, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope described above | 1 part by mass |

—Production of Cellulose Acylate Film 1—

The core layer cellulose acylate dope and the outer layer cellulose acylate dope were filtered through filter paper having an average hole diameter of 34 μm and a sintered metal filter having an average pore size of 10 μm and three layers which were the core layer cellulose acylate dope and the outer layer cellulose acylate dopes provided on both sides of the core layer cellulose acylate dope were simultaneously cast from a casting port onto a drum at 20° C. (band casting machine).

Next, the film was peeled off in a state where the solvent content was approximately 20% by mass, both ends of the film in the width direction were fixed by tenter clips, and the film was dried while being stretched at a stretching ratio of 1.1 times in the lateral direction.

Thereafter, the film was further dried by being transported between the rolls of the heat treatment device to prepare an optical film having a thickness of 40 μm, and the optical film was used as a cellulose acylate film 1. The in-plane retardation of the obtained cellulose acylate film 1 was 0 nm.

<Formation of Photoalignment Layer PA1>

The cellulose acylate film 1 was continuously coated with a coating liquid S-PA-1 for forming an alignment layer described below with a wire bar. The support on which the coating film was formed was dried with hot air at 140° C. for 120 seconds, and the coating film was irradiated with polarized ultraviolet rays (10 mJ/cm$^2$, using an ultra-high pressure mercury lamp) to form a photoalignment layer PA1. A film thickness thereof was 0.3 μm.

| (Coating liquid S-PA-1 for forming alignment layer) | |
|---|---|
| Polymer M-PA-1 shown below | 100.00 parts by mass |
| Acid generator PAG-1 shown below | 5.00 parts by mass |
| Acid generator CPI-110TF shown below | 0.005 parts by mass |
| Xylene | 1220.00 parts by mass |
| Methyl isobutyl ketone | 122.00 parts by mass |

Polymer M-PA-1

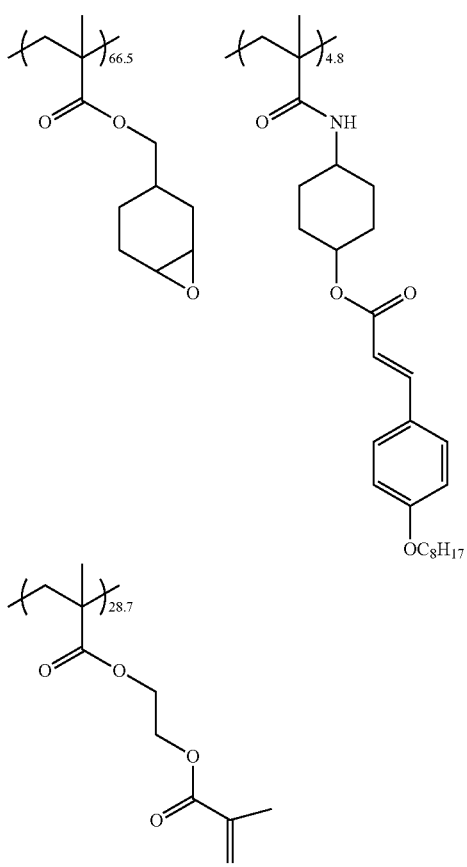

Acid generator PAG-1

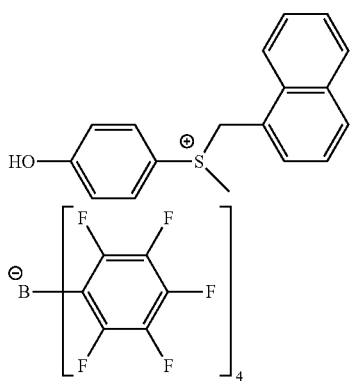

Acid generator CPI-110F

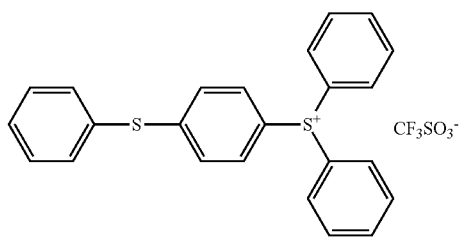

<Formation of Light Absorption Anisotropic Layer P1>

The obtained alignment layer PA1 was continuously coated with the following coating liquid S-P-1 for forming a light absorption anisotropic layer with a wire bar. Next, the coating layer P1 was heated at 140° C. for 30 seconds and cooled to room temperature (23° C.). Next, the coating layer P1 was heated at 90° C. for 60 seconds and cooled to room temperature again. Thereafter, the coating layer P1 was irradiated with an LED lamp (central wavelength of 365 nm) for 2 seconds under an irradiation condition of an illuminance of 200 mW/cm², thereby forming a light absorption anisotropic layer P1 on the alignment layer PA1. A film thickness thereof was 1.6 μm.

| Composition of coating liquid S-P-1 for forming light absorption anisotropic layer | |
|---|---|
| Dichroic substance D-1 shown below | 0.25 parts by mass |
| Dichroic substance D-2 shown below | 0.36 parts by mass |
| Dichroic substance D-3 shown below | 0.59 parts by mass |
| Polymer liquid crystalline compound M-P-1 shown below | 2.21 parts by mass |
| Low-molecular-weight liquid crystalline compound M-1 Polymerization initiator | 1.36 parts by mass |
| IRGACURE OXE-02 (manufactured by BASF SE) | 0.200 parts by mass |
| Surfactant F-1 shown below | 0.026 parts by mass |
| Cyclopentanone | 46.00 parts by mass |
| Tetrahydrofuran | 46.00 parts by mass |
| Benzyl alcohol | 3.00 parts by mass |

Dichroic substance D-1

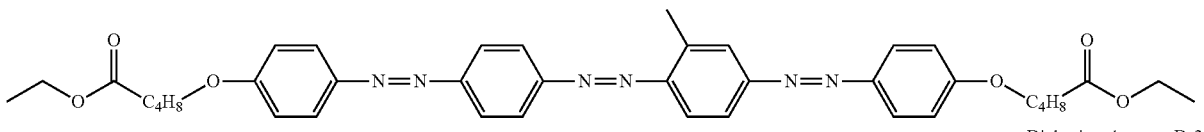

Dichroic substance D-2

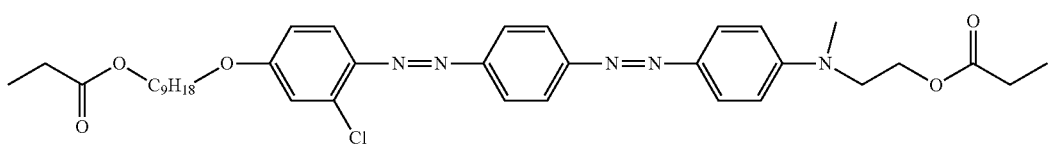

Dichroic substance D-3

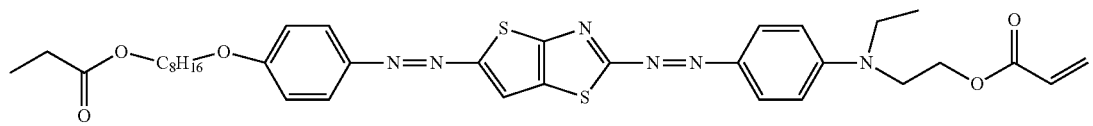

Polymer liquid crystalline compound M-P-1

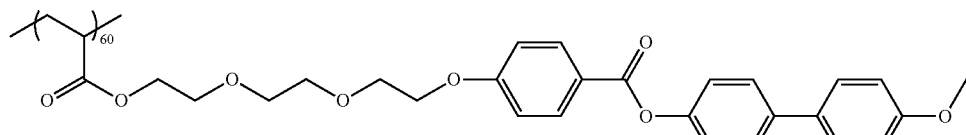

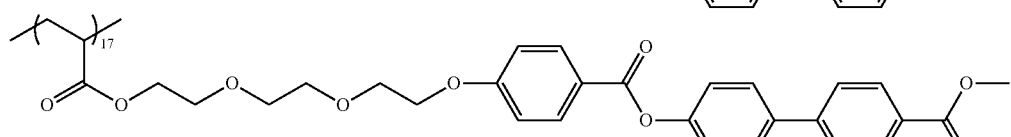

Low-molecular-weight liquid crystalline compound M-1

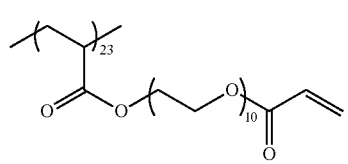

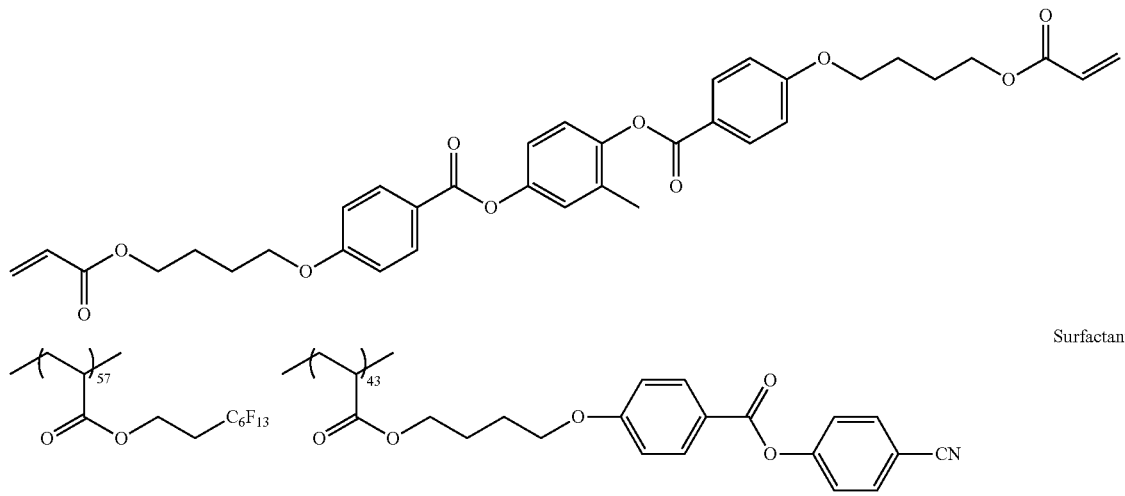

Surfactant F-1

<Transfer of Reflective Circular Polarizer>

The obtained reflective circular polarizer 1 was transferred to a support side of the obtained positive C-plate 1. At this time, the layer (fourth light reflecting layer) of the reflective circular polarizer 1 on a side opposite to the temporary support side was transferred to the positive C-plate 1 side. The temporary support of the reflective circular polarizer 1 was peeled off and removed after the transfer. The transfer of the reflective circular polarizer 1 was carried out by the following procedure.

(1) A UV adhesive Chemi-seal U2084B (manufactured by ChemiTech Inc., refractive index n after curing: 1.60) was applied onto the positive C-plate on the support side using a wire bar coater such that the thickness was set to 2 μm; the reflective circular polarizer 1 was bonded thereon using a laminator so that the opposite side of the temporary support was in contact with the UV adhesive.

(2) After nitrogen purging until the oxygen concentration reached 100 ppm or less in a purge box, the reflective circular polarizer 1 was cured by being irradiated with ultraviolet rays using a high-pressure mercury lamp from the temporary support side; the illuminance was 25 mW/cm$^2$ and the irradiation amount was 1000 mJ/cm$^2$.

(3) Finally, the temporary support of the reflective circular polarizer 1 was peeled off Next, the positive C-plate 2 was bonded to the reflective circular polarizer 1 on the first light reflecting layer side. Next, the retardation layer 1 was bonded to the positive C-plate 2.

Finally, the light absorption anisotropic layer P1 was transferred to the retardation layer 1 by the same transfer procedure as described above. Here, the lamination was performed such that the slow axis of the retardation layer 1 and the absorption axis of the light absorption anisotropic layer P1 formed an angle of 45° and the polarization axis of light emitted from the retardation layer 1 and the transmission axis of the light absorption anisotropic layer P1 were parallel to each other. In this manner, a laminated optical film using the reflective circular polarizer 1 of Example 1 was obtained.

[Evaluation of Ghost]

The lens of the virtual reality display device "Huawei VR Glass" (manufactured by Huawei Technologies Co., Ltd.), which was a virtual reality display device for which a reciprocating optical system was employed, was disassembled, and the lens on the most viewing side was taken out. The lens was a plano-convex lens having a convex surface on the viewing side, and a reflective circular polarizer was bonded to the plane side. The reflective circular polarizer was peeled off from the lens, and instead of the plane side, the laminated optical film of Example 1 was bonded such that the linear polarizer side was the viewing side. The lens to which the laminated optical film had been bonded was incorporated into the main body again to produce a virtual reality display device. In the produced virtual reality display device, a black-and-white checkered pattern was displayed on an image display panel, and ghost visibility was visually evaluated in terms of the following three stages.

A: not visible at all
B: slightly visible, but not noticeable
C: clearly seen

Furthermore, laminated optical films of Examples 2 to 11 and Comparative Example 1 were produced by the same procedure as described above, and the ghost visibility was evaluated. Table 5 shows the types of reflective circular polarizers used in each of Examples and Comparative Examples. In addition, the evaluation results thereof are described in Table 6.

As a result, in the virtual reality display devices of Examples 1 to 11, the entire region of the lens was not visible or was not noticeable. On the other hand, in the virtual reality display device of Comparative Example 1, a part of light from a white display region was clearly visible as a ghost in a black display region of the checkered pattern.

In addition, as a ghost evaluation method with higher sensitivity, in the produced virtual reality display device, the black-and-white checkered pattern was displayed on the image display panel, and ghost visibility (captured image) was evaluated in the following two stages using images captured with a luminance meter (manufactured by Radiant Vision Systems, LLC, imaging colorimeter IC-PMI16 with AR/VR lens for head-mounted display evaluation).

A: not visible at all
B: visible

As a result, in the virtual reality display devices of Examples 9 to 11, no ghost visibility (captured image) was visible over the entire region of the lens. On the other hand, in the virtual reality display devices of Comparative Example 1 and Examples 1 to 8, a part of light from a white display region was partially confirmed in the captured image as a ghost in a black display region of the checkered pattern.

Table 5. Types of reflective circular polarizers used in Examples and Comparative Examples

TABLE 11

| | Used reflective circular polarizer |
|---|---|
| Example 1 | Reflective circular polarizer 1 |
| Reference Example 1 | Reflective circular polarizer 2 |
| Comparative Example 1 | Reflective circular polarizer 3 |
| Example 2 | Reflective circular polarizer 4 |
| Example 3 | Reflective circular polarizer 5 |

TABLE 11-continued

| | Used reflective circular polarizer |
|---|---|
| Example 4 | Reflective circular polarizer 6 |
| Example 5 | Reflective circular polarizer 7 |
| Example 6 | Reflective circular polarizer 8 (laminate by UV adhesion) |
| Example 7 | Reflective circular polarizer 9 |
| Example 8 | Reflective circular polarizer 10 |
| Example 9 | Reflective circular polarizer 11 |
| Example 10 | Reflective circular polarizer 12 |
| Example 11 | Reflective circular polarizer 13 |

Table 6. Evaluation results of ghost

TABLE 12

| | Reflective circular polarizer | Ghost visibility | Ghost visibility (captured image) |
|---|---|---|---|
| Example 1 | Reflective circular polarizer 1 | A | B |
| Comparative Example 1 | Reflective circular polarizer 3 | C | B |
| Example 2 | Reflective circular polarizer 4 | B | B |
| Example 3 | Reflective circular polarizer 5 | B | B |
| Example 4 | Reflective circular polarizer 6 | B | B |
| Example 5 | Reflective circular polarizer 7 | A | B |
| Example 6 | Reflective circular polarizer 8 | A | B |
| Example 7 | Reflective circular polarizer 9 | B | B |
| Example 8 | Reflective circular polarizer 10 | A | B |
| Example 9 | Reflective circular polarizer 11 | A | A |
| Example 10 | Reflective circular polarizer 12 | A | A |
| Example 11 | Reflective circular polarizer 13 | A | A |

Examples 12 to 15

A laminated optical film used in Example 12 was obtained in the same manner as in Example 1, except that the positive C-plate 1 was not laminated in the procedure for obtaining the laminated optical film used in Example 1.

In addition, laminated optical films used in Examples 13 to 15 were obtained in the same manner as in Examples 9 to 11, except that the positive C-plate 1 was not laminated in the procedure for obtaining the laminated optical films used in Examples 9 to 11.

With regard to the laminated optical films used in Examples 12 to 15, in a case where the ghost was evaluated in the same manner as in each of Examples, the evaluations of ghost visibility and ghost visibility (captured image) were the same as in Examples 1 and 9 to 11, respectively.

EXPLANATION OF REFERENCES 10 to 13: optical laminate
21a, 22a, 23a: reflective layer A
21b, 22b, 24b: reflective layer B
25, 26: laminated reflective layer
31: first layer
32: second layer
33: third layer
34: fourth layer
27: first layer
28: second layer
29: third layer
100: laminated optical film
101: antireflection layer 102: positive C-plate
103: reflective circular polarizer
104: positive C-plate
105: retardation layer
106: linear polarizer
300: half mirror
400: circular polarizer
500: image display panel
1000: ray forming virtual image
2000: ray forming ghost

What is claimed is:

1. An optical laminate comprising:
two or more laminated reflective layers,
wherein each of the two or more laminated reflective layers includes
  one reflective layer A that includes at least one or more cholesteric liquid crystal layers formed of a first liquid crystal compound which substantially consists of a rod-like liquid crystal compound and that does not include a cholesteric liquid crystal layer formed of a second liquid crystal compound which substantially consists of a disk-like liquid crystal compound, and
  one reflective layer B that includes at least one or more cholesteric liquid crystal layers formed of the second liquid crystal compound which substantially consists of a disk-like liquid crystal compound and that does not include a cholesteric liquid crystal layer formed of the first liquid crystal compound which substantially consists of a rod-like liquid crystal compound,
in a case where, in two laminated reflective layers adjacent to each other in a lamination direction among the two or more laminated reflective layers, the one reflective layer A in one of the two laminated reflective layers and the one reflective layer A in the other of the two laminated reflective layers face each other, central wavelengths of reflected light of the one reflective layer A in one of the two laminated reflective layers and the one reflective layer A in the other of the two laminated reflective layers are different from each other, and
in a case where, in two laminated reflective layers adjacent to each other in the lamination direction among the two or more laminated reflective layers face each other, central wavelengths of reflected light of the one reflective layers B in one of the two laminated reflective layers and the one reflective layer B in the other of the two adjacent laminated reflective layers are different from each other.

2. The optical laminate according to claim 1,
wherein the one reflective layer A and the one reflective layer B are alternately arranged in the lamination direction of the optical laminate.

3. The optical laminate according to claim 1,
wherein a total number of the two or more laminated reflective layers is 20 or less.

4. The optical laminate according to claim 1,
wherein a reflectivity of the optical laminate to light having a wavelength of 400 to 700 nm is 40% or more and less than 50%.

5. A laminated optical film comprising, in the following order, at least:
a reflective circular polarizer;
a retardation layer which converts circularly polarized light into linearly polarized light; and
a linear polarizer,
wherein the reflective circular polarizer is the optical laminate according to claim 4.

6. The optical laminate according to claim 1,
wherein a total number of the two or more laminated reflective layers is 20 or less, and
a reflectivity of the optical laminate to light having a wavelength of 400 to 700 nm is 40% or more and less than 50%.

7. A laminated optical film comprising, in the following order, at least:
a reflective circular polarizer;
a retardation layer which converts circularly polarized light into linearly polarized light; and
a linear polarizer,
wherein the reflective circular polarizer is the optical laminate according to claim 6.

8. The optical laminate according to claim 1,
wherein the one reflective layer A and the one reflective layer B are alternately arranged in the lamination direction of the optical laminate, and
a reflectivity of the optical laminate to light having a wavelength of 400 to 700 nm is 40% or more and less than 50%.

9. A laminated optical film comprising, in the following order, at least:
a reflective circular polarizer;
a retardation layer which converts circularly polarized light into linearly polarized light; and
a linear polarizer,
wherein the reflective circular polarizer is the optical laminate according to claim 8.

10. The optical laminate according to claim 1,
wherein each of the two or more laminated reflective layers is configured such that the one reflective layer A and the one reflective layer B are in direct contact with each other, or configured such that the one reflective layer A and the one reflective layer B are arranged with an adhesion layer between the one reflective layer A and the one reflective layer B.

11. The optical laminate according to claim 1,
wherein each of the two or more laminated reflective layers is configured such that the one reflective layer A and the one reflective layer B are in direct contact with each other, or configured such that the one reflective layer A and the one reflective layer B are arranged with an adhesion layer between the one reflective layer A and the one reflective layer B, and
a reflectivity of the optical laminate to light having a wavelength of 400 to 700 nm is 40% or more and less than 50%.

12. A laminated optical film comprising, in the following order, at least:
a reflective circular polarizer;
a retardation layer which converts circularly polarized light into linearly polarized light; and
a linear polarizer,
wherein the reflective circular polarizer is the optical laminate according to claim 11.

13. A laminated optical film comprising, in the following order, at least:
a reflective circular polarizer;
a retardation layer which converts circularly polarized light into linearly polarized light; and
a linear polarizer,
wherein the reflective circular polarizer is the optical laminate according to claim 1.

14. The laminated optical film according to claim 13, wherein the linear polarizer includes a light absorption anisotropic layer which contains at least a liquid crystal compound and a dichroic substance.

15. The laminated optical film according to claim 13, further comprising:
a positive C-plate.

16. The laminated optical film according to claim 13, further comprising:
an antireflection layer on a surface.

17. The laminated optical film according to claim 16, wherein the antireflection layer is a moth-eye film or an AR film.

18. The laminated optical film according to claim 13, further comprising:
a resin base material having a tan δ peak temperature of 170° C. or lower.

19. The laminated optical film according to claim 13, wherein the laminated optical film is formed into a curved surface.

20. A virtual reality display device comprising:
an image display panel,
a half mirror, and
the laminated optical film according to claim 13.

21. A virtual reality display device comprising, in the following order:
an image display panel,
a half mirror, and
the laminated optical film according to claim 13,
wherein the laminated optical film comprises the reflective circular polarizer, the retardation layer, and the linear polarizer in this order from a side of the half mirror.

22. An optical article comprising:
the optical laminate according to claim 1.

23. A virtual reality display device comprising:
the optical article according to claim 22.

* * * * *